(12) United States Patent
Geaghan et al.

(10) Patent No.: US 7,864,160 B2
(45) Date of Patent: Jan. 4, 2011

(54) INTERLEAVED ELECTRODES FOR TOUCH SENSING

(75) Inventors: Bernard O. Geaghan, Salem, NH (US); Massoud S. Badaye, Vancouver (CA); Edward S. Hagermoser, Lancaster, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 1258 days.

(21) Appl. No.: 11/243,534

(22) Filed: Oct. 5, 2005

(65) Prior Publication Data

US 2007/0074914 A1    Apr. 5, 2007

(51) Int. Cl.
G06F 3/041 (2006.01)

(52) U.S. Cl. .................................................... 345/173

(58) Field of Classification Search .......... 345/173–179
See application file for complete search history.

(56) References Cited

U.S. PATENT DOCUMENTS

| | | | |
|---|---|---|---|
| 4,550,221 A | 10/1985 | Mabusth | |
| 4,680,429 A | 7/1987 | Murdock et al. | |
| 4,686,332 A | 8/1987 | Greanias et al. | |
| 5,543,588 A | 8/1996 | Bisset et al. | |
| 5,543,591 A | 8/1996 | Gillespie et al. | |
| 5,790,107 A | 8/1998 | Kasser et al. | |
| 5,844,506 A | 12/1998 | Binstead | |
| 6,147,680 A | 11/2000 | Tareev | |
| 6,297,811 B1 * | 10/2001 | Kent et al. ................... | 345/173 |
| 6,535,200 B2 * | 3/2003 | Philipp ........................ | 345/168 |
| 6,730,863 B1 * | 5/2004 | Gerpheide et al. ........ | 178/18.02 |
| 6,762,752 B2 * | 7/2004 | Perski et al. ................. | 345/173 |
| 6,825,833 B2 | 11/2004 | Mulligan et al. | |
| 6,888,538 B2 | 5/2005 | Ely et al. | |
| 6,970,160 B2 * | 11/2005 | Mulligan et al. ............ | 345/173 |
| 2003/0102875 A1 * | 6/2003 | Fujiwara et al. ............. | 324/663 |
| 2003/0217871 A1 | 11/2003 | Chao et al. | |
| 2003/0234771 A1 | 12/2003 | Mulligan et al. | |
| 2004/0239650 A1 | 12/2004 | Mackey | |
| 2006/0137813 A1 | 6/2006 | Robrecht et al. | |

FOREIGN PATENT DOCUMENTS

WO    WO 2004/112448    12/2004

OTHER PUBLICATIONS

Pending U.S. Appl. No. 11/120,025, filed May 2, 2005.
Freescale semiconductor, Electrode Design Examples, p. 24, 2005.

* cited by examiner

*Primary Examiner*—Amr Awad
*Assistant Examiner*—Waseem Moorad
(74) *Attorney, Agent, or Firm*—Steven A. Bern

(57) ABSTRACT

A capacitive touch sensing system includes a touch surface and sets of substantially parallel electrodes arranged in relation to the touch surface. Each electrode set includes a primary electrode electrically connected to at least two sub-electrodes. The primary electrode is capable of producing greater capacitive coupling to a touch in proximity with the touch surface in relation to capacitive coupling of the at least two sub-electrodes. The sub-electrodes of the electrode sets are arranged in an interleaved pattern configured to increase an effective area of capacitive coupling associated with each electrode set.

22 Claims, 18 Drawing Sheets

INTERLEAVED ELECTRODES FOR TOUCH SENSING

FIELD OF THE INVENTION

The present invention relates to methods and systems for sensing a touch in proximity with a touch surface.

BACKGROUND

Electronic displays are widely used. Although in the past the use of electronic displays has been primarily limited to computing applications such as desktop computers and notebook computers, as processing power has become more readily available, such capability has been integrated into a wide variety of applications. For example, it is now common to see electronic displays in applications such as teller machines, gaming machines, automotive navigation systems, restaurant management systems, grocery store checkout lines, gas pumps, information kiosks, and hand-held data organizers to name a few.

Interactive visual displays often include some form of touch sensitive screen. Integrating touch sensitive panels with visual displays is becoming more common with the emergence of portable multimedia devices. Capacitive touch sensing techniques for touch sensitive panels involve sensing a change in a signal due to capacitive coupling created by a touch on the touch panel. An electric field is applied to electrodes on the touch panel. A touch on the touch panel couples in a capacitance that alters the electric field in the vicinity of the touch. The change in the field is detected and used to determine the touch location.

Increasing the accuracy and/or decreasing the processing time of touch location determination is desirable. The present invention fulfils these and other needs, and offers other advantages over the prior art.

SUMMARY OF THE INVENTION

The present invention is directed to touch sensing systems and methods. In accordance with one embodiment, a capacitive touch sensing system includes a touch surface and sets of substantially parallel electrodes arranged in relation to the touch surface. Each electrode set includes a primary electrode electrically connected to at least two sub-electrodes. The primary electrode is capable of producing greater capacitive coupling to a touch in proximity with the touch surface in relation to capacitive coupling of the at least two sub-electrodes. The sub-electrodes of the electrode sets are arranged in an interleaved pattern configured to increase an effective area of capacitive coupling associated with each electrode set.

According to one aspect of the embodiment, the interleaved pattern is configured to shape touch response profiles respectively associated with the electrode sets. Each touch response profile is representative of a relationship between touch signal amplitude and touch position relative to a particular electrode set. According to another aspect, the interleaved pattern is configured to modify a slope of each touch response profile. In one implementation, a width of the primary electrode or a width of the sub-electrodes of an electrode set may be configured to shape the touch response profiles of each electrode set. In another implementation, a spacing between the primary electrode and at least two sub-electrodes of each electrode set is configured to shape the touch response profiles of the electrode sets.

According to yet another aspect of the embodiment, the interleaved pattern is configured to increase a region of linearity of the touch response profiles respectively associated with the electrode sets, each touch response profile representing a relationship between touch signal amplitude and touch position relative to a particular electrode set. In one example, the interleaved pattern may be configured to facilitate interpolation among touch signals sensed using the adjacent electrode sets to facilitate touch location determination. In another example, the interleaved pattern is configured to smooth a touch signal transition as the touch is moved from one electrode set to another electrode set. The interleaved pattern enables interpolation at the edges of the touch surface by electrically connecting a sub-electrode near one edge of the touch surface with a corresponding primary electrode near an opposite edge of the touch surface. This can improve the accuracy of the coordinate determination at the edges of the sensor.

The primary electrode may be electrically connected to the corresponding sub-electrodes of the electrode set at one or both ends of the primary electrode. The electrode sets may be further electrically connected in a coding scheme to facilitate touch location determination.

In one configuration, the electrode sets are arranged on a single layer. In another configuration, the electrode sets are arranged on first and second layers, a longitudinal axis of the electrode sets of the first layer arranged at an angle with respect to a longitudinal axis of the electrode sets of the second layer. For example, the longitudinal axis of the electrode sets of the first layer may be substantially orthogonal to the longitudinal axis of the electrode sets of the second layer.

The interleaved pattern may comprise a repetitive pattern and/or may involve single or multiple levels of interleaving. A single level of interleaving may involve one sub-electrode of each electrode set interleaved with one sub-electrode of a neighboring electrode set. Multiple levels of interleaving may involve two or more sub-electrodes of each electrode set interleaved with two or more sub-electrodes of an adjacent electrode set.

The touch sensing system may further comprise circuitry configured to measure signals sensed using the electrode sets and a touch processor coupled to the sensor circuitry and configured to determine a location of the touch in proximity with the touch surface based on the measured signals. In some implementations, at least a portion of the sensor circuitry can be disposed within a touch implement, for example provided in the form of a stylus. The touch surface and the sets of electrodes may form a transparent touch screen. The touch sensing system may further comprise a display viewable through the transparent touch screen.

Another embodiment of the invention is directed to a capacitive touch sensing system including a touch surface and sets of electrically connected and substantially parallel electrodes arranged in relation to the touch surface. Each set of electrodes includes a primary electrode and at least two sub-electrodes disposed on either side of the primary electrode and having a smaller surface area than the primary electrode. The sub-electrodes of the electrode sets are interleaved.

In one implementation, the width of each primary electrode and/or the width of each sub-electrode varies along a longitudinal axis of the primary electrode or sub-electrode. The electrode sets may be disposed on two layers, wherein electrodes on a first layer include geometric elements, and electrodes on a second layer include geometric elements complementary with the geometric elements of the first layer electrodes. The complementary geometric elements of the first and second layer electrodes are configured to enhance capacitive coupling of the second layer electrodes.

In one implementation, the primary electrode of each electrode set may comprise a first number of adjacent electrode elements having substantially equal width and the sub-electrodes of each electrode set may comprise a second number of adjacent electrode elements having substantially equal width.

Another embodiment of the invention is directed to a touch sensing method. A touch in proximity with a touch surface is capacitively sensed using a first set of electrodes. The first set of electrodes includes electrically connected and substantially parallel first primary electrode and first sub-electrodes disposed on either side of the first primary electrode. A first touch signal is generated based on the touch sensed using the first electrode set. The touch is capacitively sensed using one or more sets of electrodes adjacent to the first electrode set. Each adjacent set of electrodes includes electrically connected and substantially parallel adjacent primary electrode and adjacent sub-electrodes disposed on either side of the adjacent primary electrode. The adjacent sub-electrodes are interleaved with the first sub-electrodes to increase an area of capacitive coupling of the first and adjacent electrode sets. One or more additional touch signals are generated based on the touch sensed using the one or more adjacent sets of electrodes. A location of the touch is determined based on at least one of the first and the one or more additional touch signals.

According to one implementation, determining the location of the touch may involve interpolating among the first and the one or more additional touch signals. In various configurations, the touch may be a finger touch, may be produced by an electrically passive touch implement, or may be produced by an electrically active touch implement.

Yet another embodiment of the invention is directed to a method for making a touch sensor. The method includes disposing sets of electrodes on a substrate in accordance with an interleaved pattern configured to increase an effective area of capacitive coupling associated with each set of electrodes. Each set of electrodes includes a primary electrode disposed between at least two sub-electrodes electrically connected and substantially parallel to the primary electrode. The primary electrode is capable of producing greater capacitive coupling to a touch in relation to capacitive coupling of the at least two sub-electrodes.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
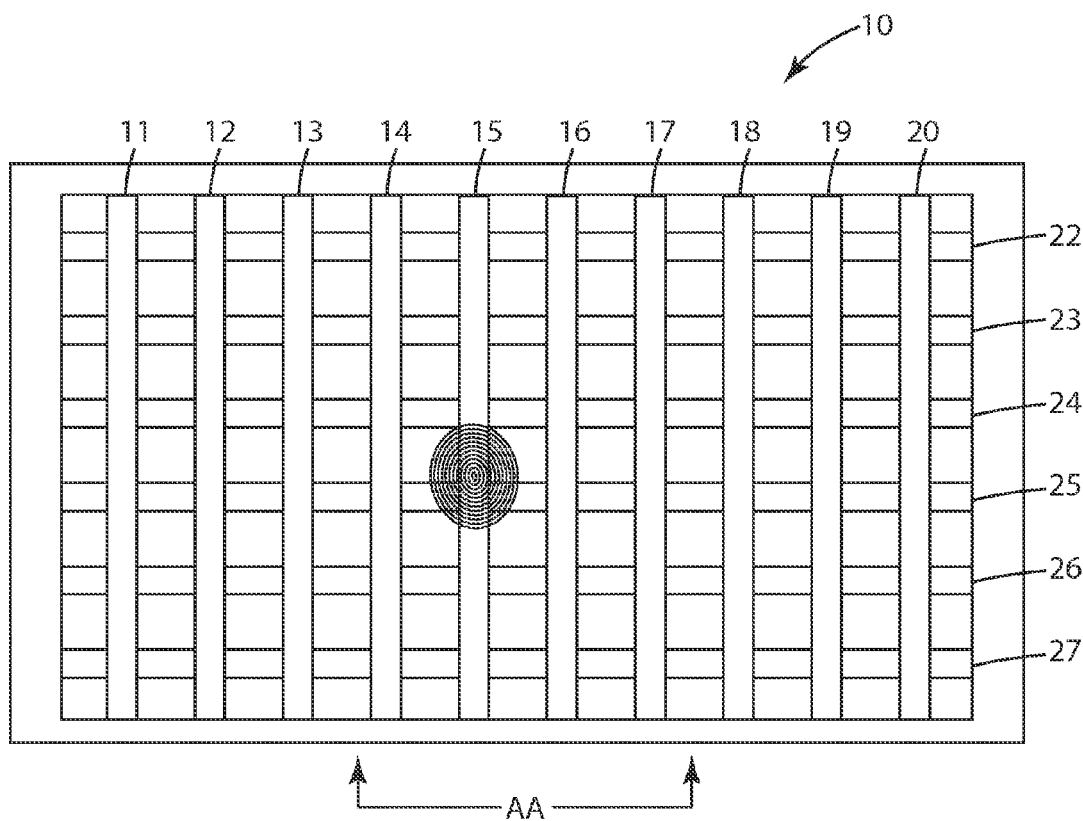
FIG. 1 illustrates a plan view of a matrix touch screen.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that the embodiments may be utilized and structural changes may be made without departing from the scope of the present invention.

In various implementations, capacitive touch sensors may include a layer of substantially parallel electrodes, or may include first and second layers of substantially parallel electrodes, or may include a first layer of electrodes with a planar electrode disposed on a second layer, or may include other electrode configurations. Touch sensing involves detecting changes in electrical signals present at the electrodes in the vicinity of a touch. In some implementations, the touch sensor may use a first layer of parallel electrodes to sense the touch location in the Y-direction and a second layer of parallel electrodes, arranged substantially orthogonally to the first layer electrodes, to detect the touch location in the X-direction. The X and Y electrodes may be driven with applied electrical signals, or an active stylus may couple signals onto electrodes. A touch to or near the touch surface may capacitively couple X and Y electrodes in the vicinity of the touch to ground, or a touch may capacitively couple signal from one electrode to an adjacent electrode. A touch to or near the touch surface may capacitively couple a transmitter stylus signal to X and Y electrodes in the vicinity of the touch. The capacitive coupling causes a change in the electrical signal on the electrodes near the touch location. The amount of capacitive coupling to each electrode, and thus the change in the signal on the electrode or in a receiver stylus, varies with the distance between the electrode and the touch. The X and Y touch location may be determined by examining the changes in the electrical signals detectable on the X and Y electrodes or in a receiver stylus.

Accurate determination of the touch location involves processing signals sensed on multiple electrodes in the vicinity of the touch. For example, touch signal processing may include interpolation among signal values sensed on two or more electrodes in the vicinity of the touch. Thus, information acquired from the most altered signal sensed on the electrode nearest to the touch may be combined with additional information acquired from signals sensed on electrodes farther away from the touch location.

The present invention is directed to the use of interleaved and interconnected electrodes to shape a touch signal profile to enhance touch signal processing for touch location determination. A touch signal profile defines a relationship between touch signal amplitude and distance from the touch position to the electrode used to sense the touch signal. In accordance with various embodiments of the invention, the interleaved pattern of electrodes is arranged to modify a slope and/or to increase a region of linearity of the touch response profile. The modification of the touch response profile produced by the interleaved electrodes enhances interpolation of touch signals to provide simpler and more accurate touch location determination.

Figure 2A:
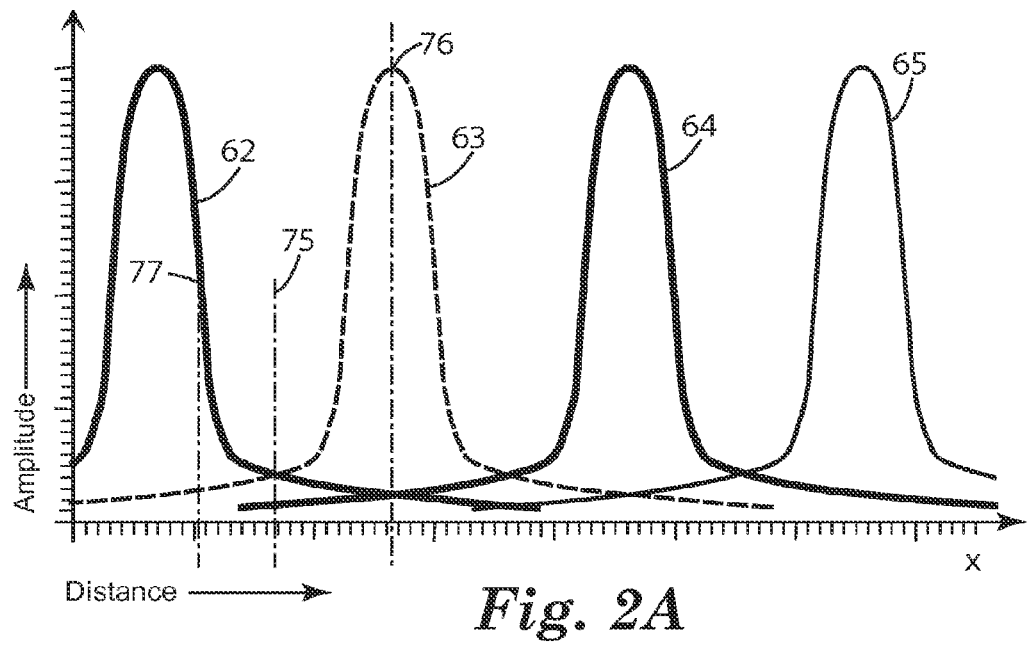
FIG. 2A illustrates touch response profiles produced by a regular pattern of electrodes.
Figure 2B:
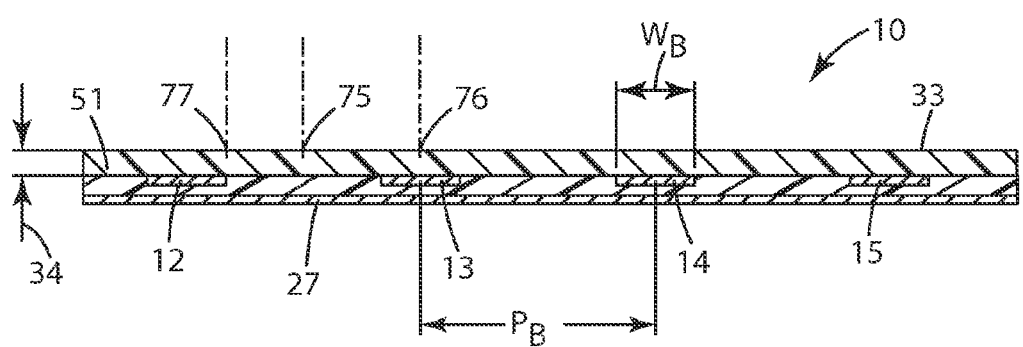
FIG. 2B illustrates a cross section view of the matrix touch screen of FIG. 1.

The embodiments described below are based on matrix capacitive touch technology, although the concepts are equally applicable to other types of capacitive touch sensors that employ one or more layers of substantially parallel electrodes, including for example the single-layer sensors described in commonly owned U.S. Pat. No. 6,825,833 which is incorporated herein by reference. Matrix capacitive touch sensors known in the art typically use two layers of electrodes, a top layer of electrodes 11-20 arranged orthogonally to a bottom layer of electrodes 22-27 as illustrated in plan view in FIG. 1 and in cross section in FIG. 2B. As shown in FIG. 2B, the top layer electrodes 11-20 have width $W_B$ and spacing $P_B$. The electrodes 11-20 and 22-27 may be connected to controller electronics (not shown) through bus lines (not shown) and touch measurement ports (TMPs) (also not shown). The controller may provide drive/sense circuitry for measuring the signal changes on the electrodes or in a stylus, in response to a touch on the touch sensor. The controller may also include a touch processor capable of determining the touch location based on the measured signal changes.

FIG. 2B depicts cross section AA of sensor 10, including a first layer of electrodes 12-15. Electrode 27 represents one of the lower electrodes of the matrix, which are substantially orthogonal to electrodes in sets 12-15. A touch by a touch implement, such as a finger or stylus, provides capacitive contact between one or more of electrodes 12-15 and electrical ground, not shown. FIG. 2A shows touch response profile curves 62-65 representing magnitudes of signal coupling from a touch to electrodes 12-15 with respect to the touch position. As the touch moves on or near surface 33 across each electrode, signal coupling increases to a maximum when the touch is directly over an electrode; then the magnitude decreases as the distance between the electrode and the touch increases. The shape of each touch response profile 62-65 depends on the width of the electrode, the width and shape of the touch implement, and the minimum distance 34 between the touch implement and an electrode, which is typically the thickness of overlay 51.

Touch response profiles 62-65 of FIG. 2A are associated with the amount of capacitive coupling vs. distance between the touch and the electrode. Slopes of profiles 62-65 indicate a rate of change of touch signal magnitude (i.e. the amount of coupling) vs. touch implement position in the plane of surface 33. A touch at point 75 couples most strongly to electrodes 12 and 13. Movement of the touch in the positive X direction results in an increase of signal 63 and decrease of signal 62. Curve fitting or interpolation of signals 62 and 63 may be used to calculate the position of the touch between electrodes 12 and 13. Sensitivity (accuracy and resolution) of the curve fit or interpolation will be a function of the slopes and relative positions (e.g., degree of overlap) of curves 62 and 63.

For example, the slope of curve 62 for a touch at point 75 is −180°, and the slope of curve 63 is +18°. For purposes of illustration, equal graphical units are assigned to the horizontal and vertical axes of FIG. 2A, so an 18° slope yields 0.32 units of change in amplitude in curve 62 for each unit of horizontal movement of a touch. Curve 63 has an approximately equal and opposite amplitude change so position sensitivity is 0.64 as calculated by Equation 1, where Equation 1 is a simplified approximation of sensitivity that may be achieved by a typical interpolation algorithm, to wit:

$$\text{Position sensitivity (PS)} \cong (|\Delta \text{ signal 1}| + |\Delta \text{signal 2}|)/|\Delta \text{ touch position}| \qquad (1)$$

where "Δ signal 1" represents the change in the touch signal amplitude measured using a first electrode, "Δ signal 2" represents the change in the touch signal amplitude measured using a second electrode, and "Δ touch position" represents the change in the touch position. At point 76, curve 63 has a slope of zero, so curve 63 magnitude is insensitive to touch movement, and an incremental change in the position of the touch will not change the signal magnitude significantly. Curves 62 and 64 may be used to increase the sensitivity of a touch position calculation. The slopes of curves 62 and 64 are +11° and −11° respectively for point 76, yielding a combined sensitivity of 0.38 according to Equation 1. This is the lowest positional sensitivity point on the touch surface, so the resolution of position calculations will be lowest for point 76 even though the presence of a touch is sensed very strongly, as indicated by the large magnitude of curve 63 corresponding to point 76.

A touch at point 77 yields relatively high sensitivity due to the steep (−84°) slope of curve 62 at that point. While interpolation between curve 62 and curve 63 is quite sensitive to touch implement horizontal position at point 77, the differences in slope between curve 62 and 63 makes X position calculation by linear interpolation inaccurate. A non-linear interpolation is preferred, to account for the differences in slopes of curves such as 62 and 63.

Sensitivity could be improved by moving electrodes 12-15 closer together, resulting in increased overlap of curves 62-65 and increased slopes of curves in the areas where interpolation is required. But, additional electrodes would be required to cover a given area. This requires additional processing circuitry for the additional electrodes. Connecting each of the electrodes 11-20 and 22-27 to the controller through a separate signal lines and TMP allows for individual sensing of each electrode. However, in larger touch screens, the number of electrodes prohibits individual sensing.

Figure 3A:
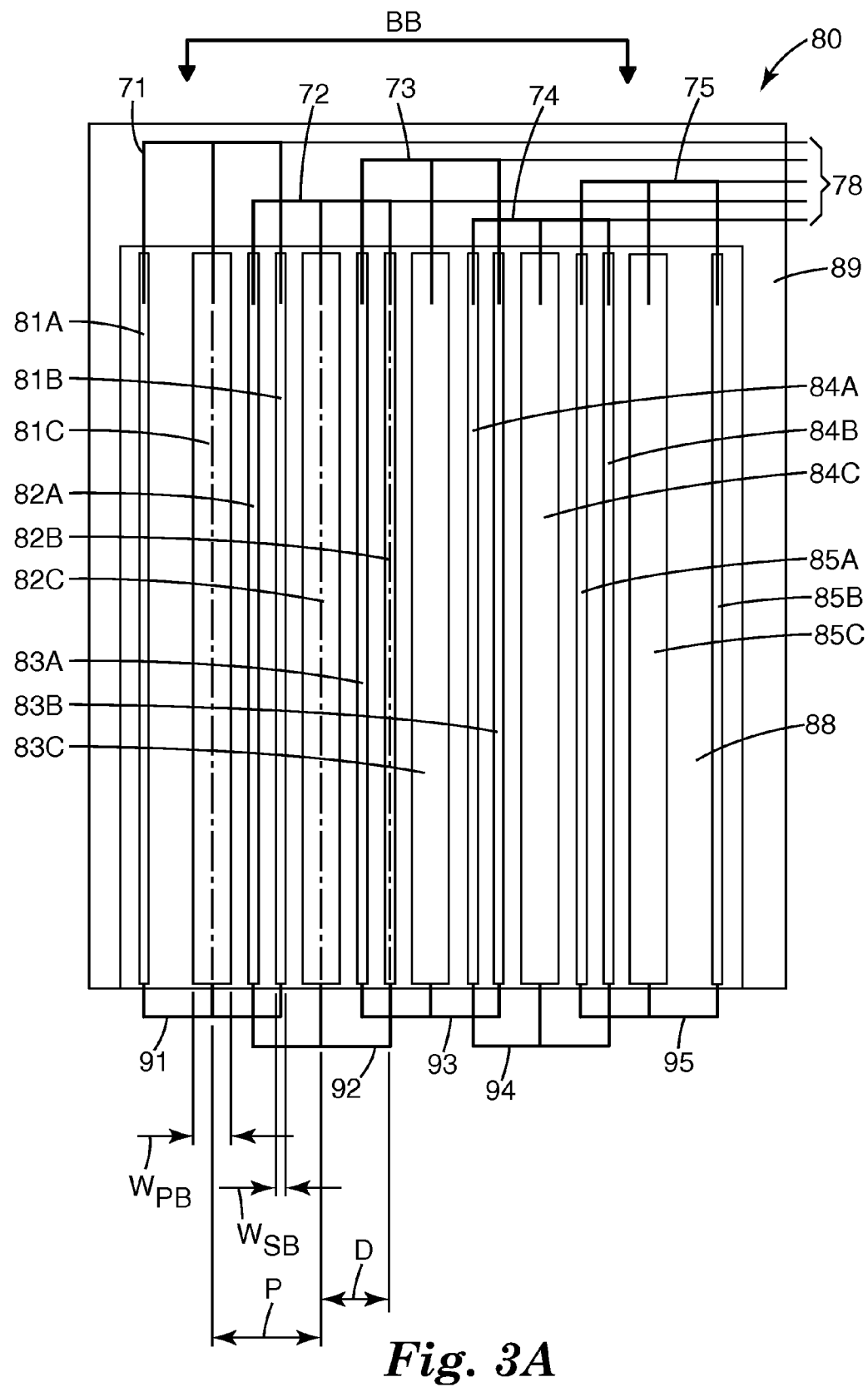
FIGS. 3A and 3B illustrate a plan view and a cross sectional view of a touch screen having electrodes arranged in an interleaved pattern in accordance with embodiments of the invention.
Figure 3B:
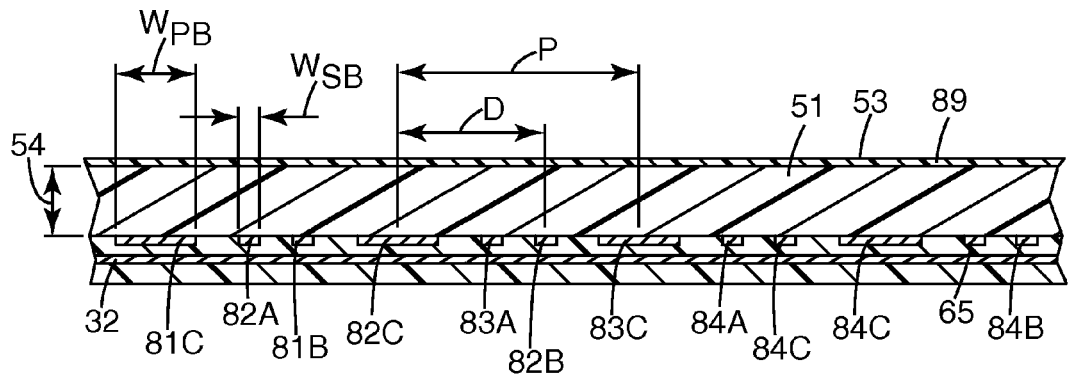

A touch sensing system having sets of electrodes arranged in an interleaved pattern in accordance with embodiments of the invention is illustrated in FIGS. 3A and 3B. FIG. 3A shows one layer of a matrix touch sensor 80 having 5 sets of electrodes. Each set has a primary electrode 81C, 82C, 83C, 84C, 85C electrically interconnected with two sub-electrodes 81A, 81B, 82A, 82B, 83A, 83B, 84A, 84B, 85A, 85B arranged on either side of an associated primary electrode 81C, 82C, 83C, 84C, 85C. For example, set 82 includes primary electrode 82C and sub-electrodes 82A and 82B. Flanking sub-electrodes of each set are interleaved with flanking sub-electrodes of adjacent sets. In this example, the right-most sub-electrode 81B of set 81 is interleaved with the left-most sub-electrode 82A of set 82; the right-most sub-electrode 82B of set 82 is interleaved with the left-most sub-electrode 83A of set 83; the right-most sub-electrode 83B of set 83 is interleaved with the left-most sub-electrode of set 84 and the right-most sub-electrode 84B of set 84 is interleaved with the left-most sub-electrode of set 85. The interleaved pattern of the electrode sets 81-85 alters the touch response profiles associated with the electrode sets.

Sub-electrodes 81A, 81B, 82A, 82B, 83A, 83B, 84A, 84B, 85A, 85B of each set 81-85 are electrically connected to each other and their corresponding primary electrode 81C, 82C, 83C, 84C, 85C by interconnects 71-75 at one end of the primary electrode 81C, 82C, 83C, 84C, 85C and sub-electrodes 81A, 81B, 82A, 82B, 83A, 83B, 84A, 84B, 85A, 85B. The sub-electrodes 81A, 81B, 82A, 82B, 83A, 83B, 84A, 84B, 85A, 85B of each set 81-85 may also be electrically connected to each other 81A to 81B, 82A to 82B, 83A to 83B, 84A to 84B, 85A to 85B and to their corresponding primary electrode 81C, 82C, 83C, 84C, 85C at the opposite end by interconnects 91-95. The interleaved arrangement of the primary electrodes 81C, 82C, 83C, 84C, 85C and sub-electrodes 81A, 81B, 82A, 82B, 83A, 83B, 84A, 84B, 85A, 85B is configured to increase an area of capacitive coupling associated with each primary electrode 81C, 82C, 83C, 84C, 85C.

The sets of electrodes 81-85 connected to controller circuitry through TMPs via signal lines 78. The touch area 88 of sensor 80 is surrounded on three sides by shield 89. The signal lines 78 are shielded with electrostatic shield 89. Interconnects 91-95 may be shielded but need not be. Primary electrodes 81C, 82C, 83C, 84C, 85C have width $W_{PB}$ and sub-electrodes 81A, 81B, 82A, 82B, 83A, 83B, 84A, 84B, 85A, 85B have width $W_{SB}$. In some embodiments, $W_{PB}$ is greater than $W_{SB}$, making the surface area of primary electrodes 81C, 82C, 83C, 84C, 85C greater than their corresponding electrodes 81A, 81B, 82A, 82B, 83A, 83B, 84A, 84B, 85A, 85B. The larger surface area of the primary electrodes 81C, 82C, 83C, 84C, 85C increases the capacitive coupling of the primary electrodes 81C, 82C, 83C, 84C, 85C in relation to their corresponding sub-electrodes 81A, 81B, 82A, 82B, 83A, 83B, 84A, 84B, 85A, 85B. As illustrated in FIG. 3B, the spacing between primary electrodes is P and the spacing between a primary electrode and a corresponding sub-electrode is D.

FIG. 3B depicts cross section BB of sensor 80, including electrode sets 81-84. Overlay plate 51 has thickness 54. Touch surface 53 is on the top surface of plate 51. Electrode 32 represents the lower electrodes of the matrix, which are substantially orthogonal to electrodes in sets 81-84. Lower electrodes are separated from top electrodes 81-84 by a dielectric spacer.

Figure 4:
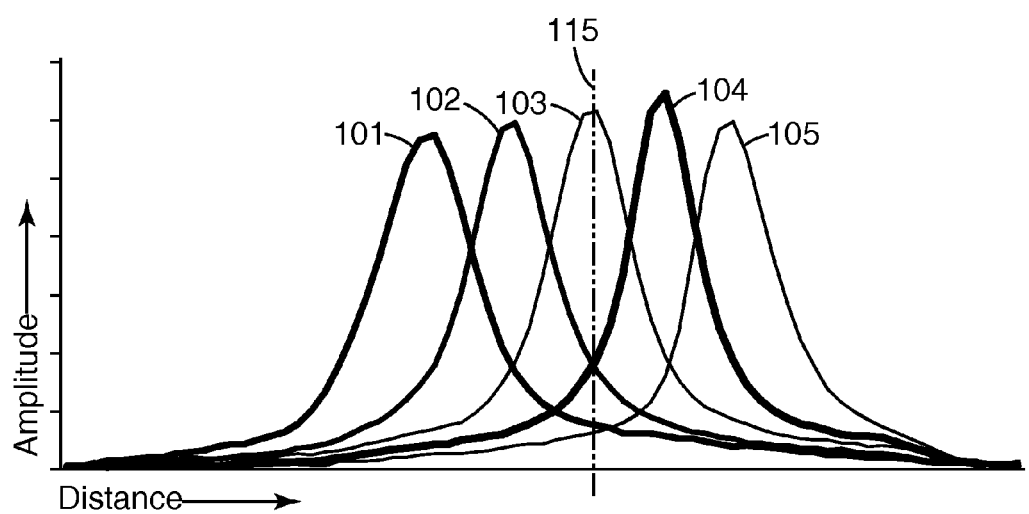
FIGS. 4 illustrates touch response profiles of the five primary electrodes of the touch screen of FIGS. 3A and 3B.

FIG. 4 illustrates touch response profiles (touch signal amplitude vs. distance of the touch from the sensing electrode) of the five primary electrodes 81C, 82C, 83C, 84C, 85C of sensor 80. Curves 101, 102, 103, 104, and 105 are the signals measured from electrodes 81C, 82C, 83C, 84C, and 85C respectively. Position sensitivity (PS) of these curves may be calculated from Equation 1, repeated below, using the slopes of curves. For example, the slopes of curves 102 and 104 at point 115 are −55° and +55° respectively, resulting in PS of 2.86. Slopes of curves 101 and 105 at point 115 are −13° and +13° respectively so PS to these electrodes is 0.46. Interpolation is possible with these slopes, but an improvement can be made by using interleaved sub-electrodes.

Figure 5:
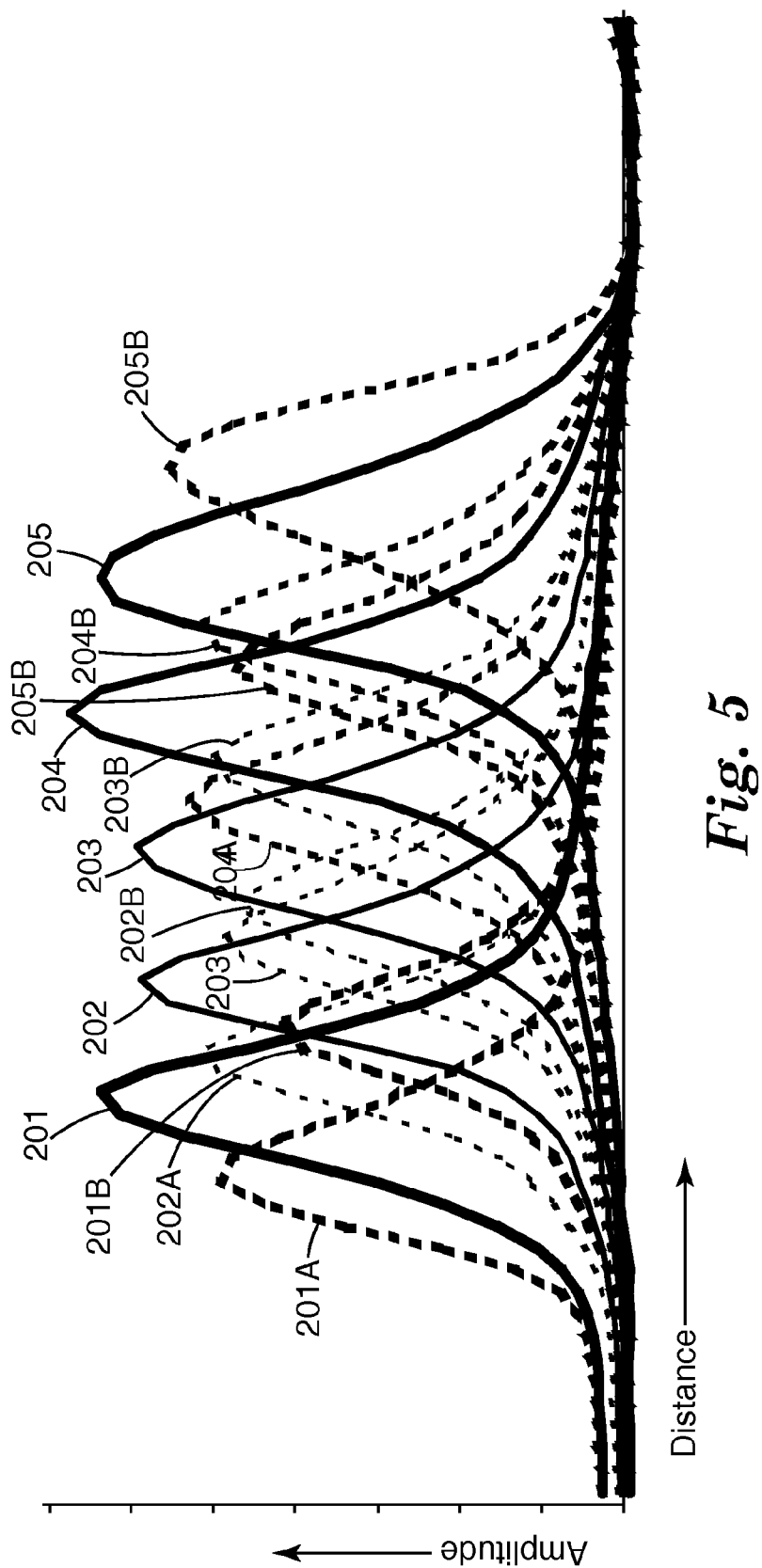
FIG. 5 illustrates touch response profiles of the primary electrodes and sub-electrodes of the touch screen of FIGS. 3A and 3B, with interconnections 71-75 and 91-95 removed.

FIG. 5 shows touch profile responses measured on all 15 electrodes of sensor 80, with interconnections 71-75 and 19-95 removed. Larger signals 201, 202, 203, 204, 205 are measured from the primary electrodes 81C, 82C, 83C, 84C, 85C. Smaller signals 201A 201B, 202A, 202B, 203A 203B, 204A, 204B, 205A, 205B were measured on the sub-electrodes.

Figure 6:
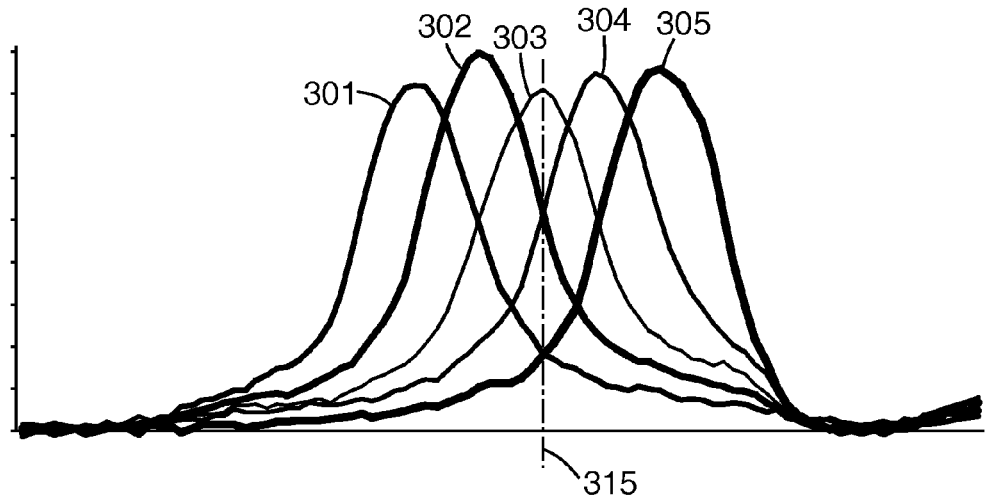
FIG. 6 illustrates touch response profiles of the primary electrodes and sub-electrodes of the touch screen of FIGS. 3A and 3B, interconnected as shown in FIG. 3A, with a thick overlay.

FIG. 6 shows touch profile responses measured with each of the 5 electrode sets 81-85 interconnected at one end. Each of the primary electrodes 81C, 82C, 83C, 84C, 85C is connected to its corresponding two sub-electrodes 81A, 81B, 82A, 82B, 83A, 83B, 84A, 84B, 85A, 85B as shown in FIG. 3A. For example, primary electrode 81C is connected to corresponding sub-electrodes 81A and 81B, primary electrode 82C is connected to corresponding sub-electrodes 82A and 82B, primary electrode 83C is connected to corresponding sub-electrodes 83A and 83B, primary electrode 84C is connected to corresponding sub-electrodes 84A and 84B, and primary electrode 85C is connected to corresponding sub-electrodes 85A and 85B. The resulting touch response profiles 301-305 of FIG. 6 are similar to curves 101-105, except that each of curves 301-305 spreads over a wider area, due to the total breadth covered by the primary electrodes and their corresponding sub-electrodes. This results in greater overlap with adjacent curves, and thus greater sensitivity for interpolation.

PS of these curves may be calculated from Equation 1, using the slopes of curves. For example, the slopes of curves 302 and 304 at point 315 are −75° and +75° respectively. Slopes of curves 301 and 305 at point 316 are −50° and +50° respectively, so PS is 7.46 to adjacent electrodes and 2.38 to second nearest electrodes. This compares favorably to the PS of 2.86 and 0.46 calculated for non-interleaved electrodes of the same spacing.

The use of sets of electrodes including primary electrodes and two or more sub-electrodes interleaved with adjacent sub-electrodes increases the region of the capacitive coupling of the electrode sets, resulting in a larger touch active area associated with each electrode set. Further, the interleaved sub-electrodes smooth the touch signal transition as a touch implement is moved from one electrode set to the next.

The electrode sets may be arranged in a repetitive pattern. For example, the pattern may be repetitive, wherein the primary electrode widths are substantially the same for each set, the sub-electrode widths are substantially the same for each set, the spacing between the primary electrodes and sub-electrodes is substantially the same for each set and the spacing between adjacent sub-electrodes is substantially the same for each set of electrodes. The pattern may also be designed such that the capacitive coupling of a particular set of electrodes varies linearly with distance from the primary electrode. This is advantageous where linear interpolation is used. In some implementations, such as sensor 80 of FIG. 3A, each set of electrodes includes one level of sub-electrodes, e.g., one primary electrode and two sub-electrodes, one sub-electrode at either side of the primary electrode. In other implementations, more than two sub-electrodes may be used to achieve additional levels of sub-electrode interleaving. The additional levels of sub-electrode interleaving need not be symmetrical with respect to the primary electrode. For example, a set of electrodes may include two levels of interleaved sub-electrodes on one side of the primary electrode and one level of interleaved sub-electrodes on another side of the primary electrode.

Figure 7:
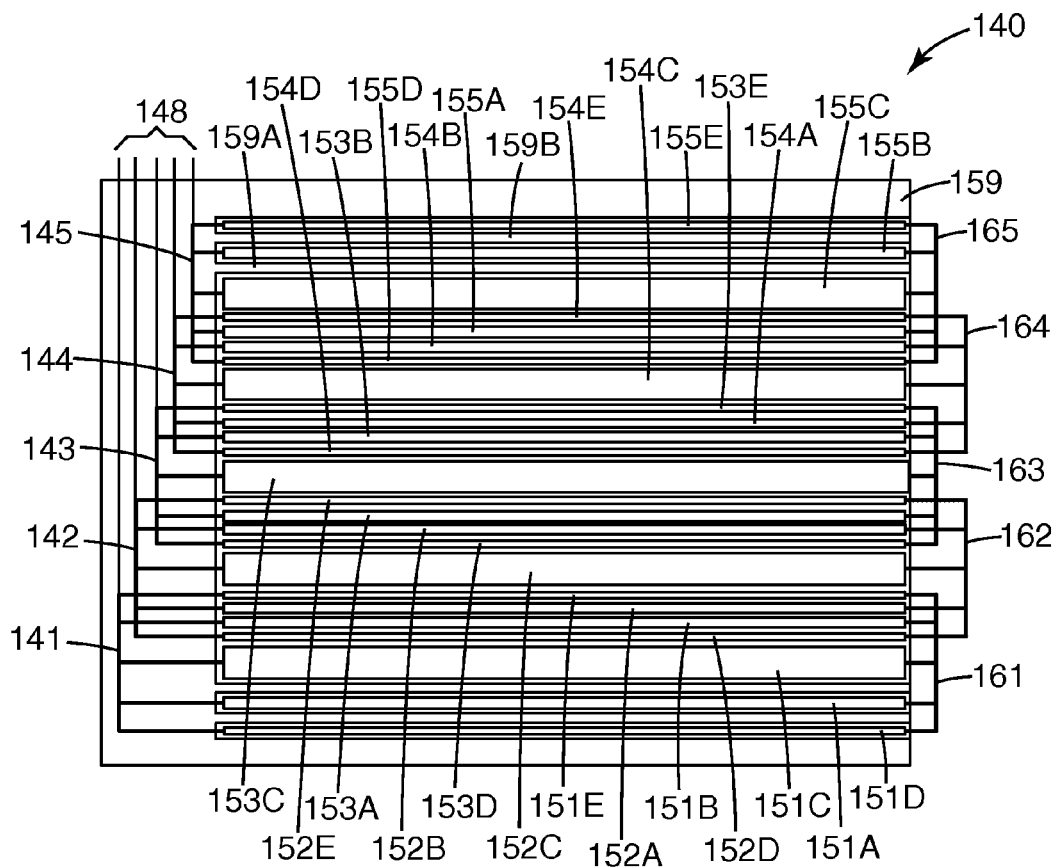
FIG. 7 is a plan view of a touch sensor having two levels of interleaved sub-electrodes in accordance with embodiments of the invention.

FIG. 7 illustrates a sensor 140 having five sets of electrodes 151-155 having two levels of interleaved sub-electrodes 151A, 151B, 151D, 151E, 152A, 152B, 152D, 152E, 153A, 153B, 153D, 153E, 154A, 154B, 154D, 154E, 155A, 155B, 155D, 155E on either side of the primary electrodes 151C, 152C, 153C, 154C, 155C. Each set of electrodes 151-155 has a primary electrode 151C, 152C, 153C, 154C, 155C and four corresponding sub-electrodes 151A, 151B, 151D, 151E, 152A, 152B, 152D, 152E, 153A, 153B, 153D, 153E, 154A, 154B, 154D, 154E, 155A, 155B, 155D, 155E interleaved at two levels with neighboring sets. For example, primary electrode 151C has corresponding sub-electrodes 151A, 151B, 151D, 151E. The two right-most sub-electrodes 151B, 151E of primary electrode 151C are interleaved with the two left-most sub-electrodes 152A, 152D of primary electrode 152C; the two right-most sub-electrodes 152B, 152E of primary electrode 152C are interleaved with the two left-most sub-electrodes 153A, 153D of primary electrode 153C; the two right-most sub-electrodes 153B, 153E of primary electrode 153C are interleaved with the two left-most sub-electrodes 154A, 154D of primary electrode 154C; the two right-most sub-electrodes 154B, 154E of primary electrode 154C are interleaved with the two left-most sub-electrodes 155A, 155D of primary electrode 155C.

The widths of the primary electrodes and sub-electrodes and/or the spacing between electrodes may be selected to control the shape of the touch response profile. Where a primary electrode has multiple sub-electrodes on each side, as in FIG. 7, the sub-electrodes on each side of a primary electrode may be substantially equally spaced from one another. Alternatively the distance between adjacent sub-electrodes of a set may be varied. Increasing the distance between the electrodes of a set spreads out the touch response profile associated with the set of electrodes. For example, profiles 101-105 were measured with a 15 mm finger touch implement width, $W_B=5$ mm, $P_B=19$ mm, and min. distance 34=2.1 mm, (referring to FIG. 2). Profiles 301-305 were measured with the same main electrode dimensions, (referring to FIG. 3A) $W_{PB}=5$ mm, P=19 mm, overlay thickness 54=2.1 mm, and sub-electrode dimensions $W_{SB}=1$ mm and D=12 mm. Maximum electrode spacing is limited by the combination of touch implement width and overlay plate thickness. Larger touch implements and a thicker overlay plate smooth out the profile signal and allow larger distances P and D between primary electrodes and sub-electrodes.

Figure 8:
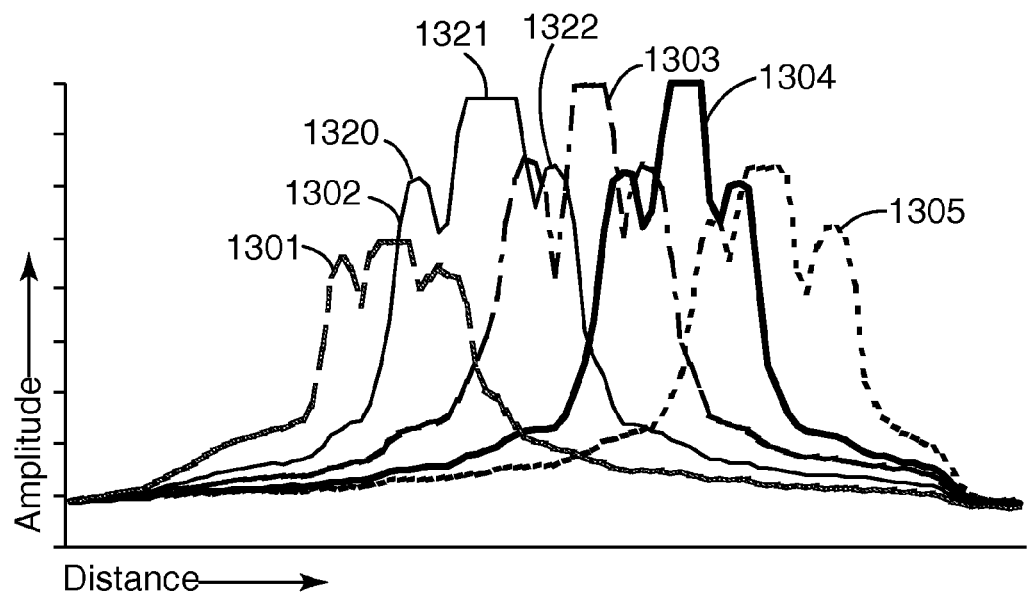
FIG. 8 illustrates touch response profiles of the primary electrodes and sub-electrodes of the touch screen of FIGS. 3A and 3B, interconnected as shown in FIG. 3A, with a thin overlay.

FIG. 8 shows profiles 1301-1305 that were measured on the same electrode sets as profiles 101-105 of FIG. 4 and the same touch implement was used, except that overlay thickness 54=0.18 mm rather than 2.1 mm. With this thin overlay, signal coupling to primary electrodes and sub-electrodes no longer merge together to form a smooth curve. Instead, profiles 1301-1305 vary more with touch implement position, so each primary electrode and each sub-electrode of a set generates a separate peak in the profile of the set. For example, profile 1302 has peaks 1320, 1321, and 1322. In addition, the thin overlay causes signals so large that the electronic controller is overdriven, resulting in a flattening of primary peak 1321.

Profiles such as those in FIG. 8 are not necessarily desirable for most interpolation algorithms. In the case where an overlay thickness is 0.18 mm thick, spacing among primary electrodes and sub-electrodes must be reduced proportionally.

Figure 9:
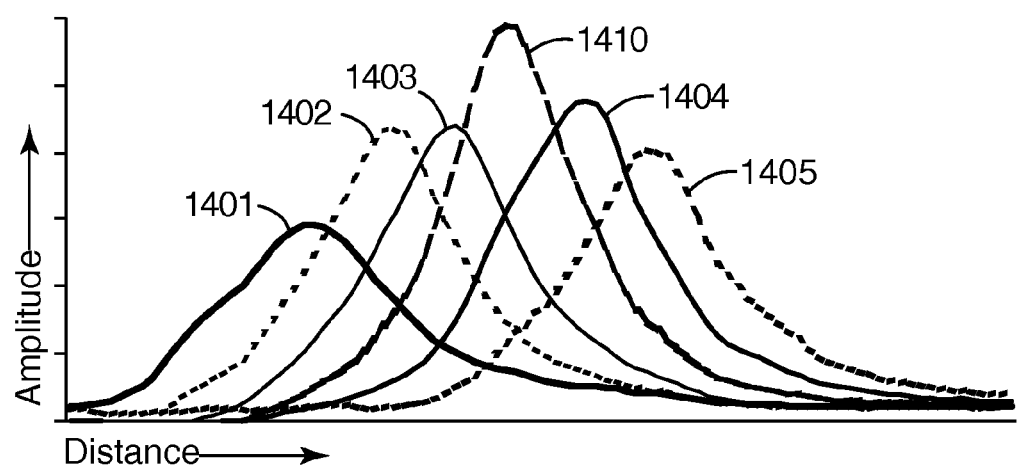
FIG. 9 illustrates touch response profiles of electrodes of various widths, with a thick overlay.

FIG. 9 shows profiles 1401-1405 and 1410 that were measured by a 15 mm wide touch implement making capacitive contact through 2.1 mm glass overlay to non-interleaved electrodes separated by 1 cm center-to-center. Electrode 1401 is a 30AWG wire of 0.25 mm diameter. Electrodes 1402-1405 are flat, 1 mm wide. Electrode 1410 is flat, 3 mm wide. The difference in magnitude among electrodes of different widths indicates the non-linear relationship between width and the amount of capacitive coupling. Differences in the amplitude among the same-width electrodes 1402-1405 indicate measurement error of the system.

Figure 10:
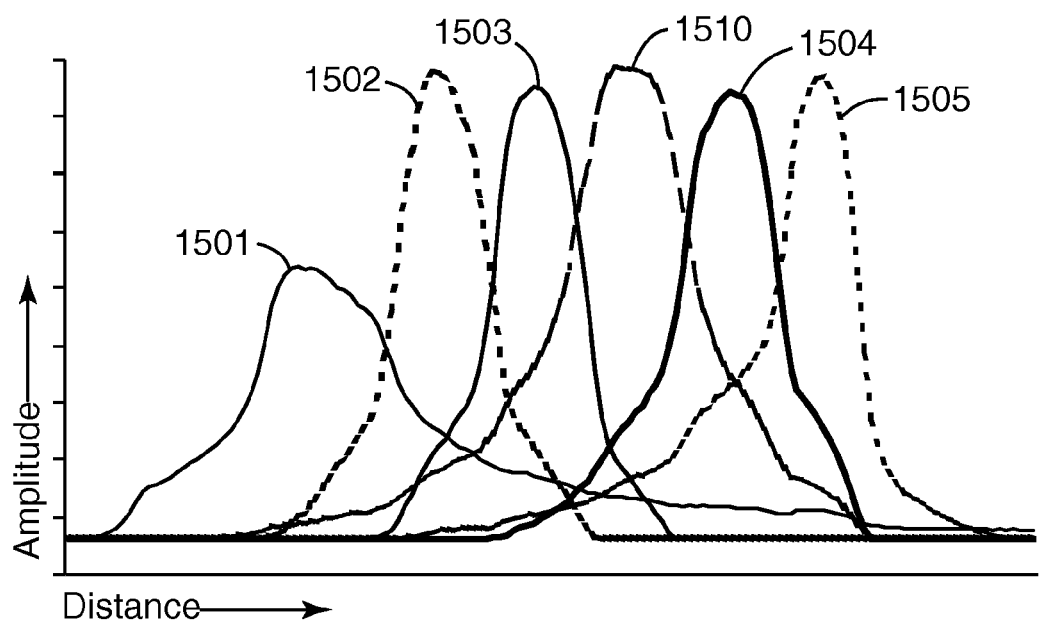
FIG. 10 illustrates touch response profiles of electrodes of various widths, with a thin overlay.

FIG. 10 shows profiles 1501-1505 and 1510 that were measured on the same electrodes as shown in FIG. 9, except the capacitive contact from a finger to electrodes is made through a 0.18 mm overlay thickness. The difference in magnitude among electrodes of different widths indicates the non-linear variation of capacitive coupling as width and overlay thickness are varied. Differences in the peak intensity among the same-width electrodes 1502-1505 indicate error of the measurement system.

The widths of the primary electrodes and sub-electrodes for each set may be substantially equal or the widths of the primary electrodes may be different from the widths of the sub-electrodes. In some embodiments, the width of the primary electrode is greater than the widths of the sub-electrodes to achieve the larger capacitive coupling of the primary electrode. In further embodiments, the width of the primary electrode may be equal to or less than the widths of the corresponding sub-electrodes. A larger capacitive coupling of the primary electrode may be achieved by arranging the primary electrode closer to the touch surface, for example.

The sub-electrodes in a set may each have substantially the same width or may have different widths. For example, the sub-electrodes for different levels may have different widths as illustrated in FIG. 7. In this example, the primary electrodes 151C, 152C, 153C, 154C, 155C are the widest electrodes, producing greater capacitive coupling, the first level sub-electrodes 151A, 151B, 152A, 152B, 153A, 153B, 154A, 154B, 155A, 155B nearest their corresponding primary electrodes 151C, 152C, 153C, 154C, 155C are the next widest electrodes and the second level sub electrodes 151D, 151E, 152D, 152E, 153D, 153E, 154D, 154E, 155D, 155E have the narrowest widths in each set of electrodes.

Figure 11:
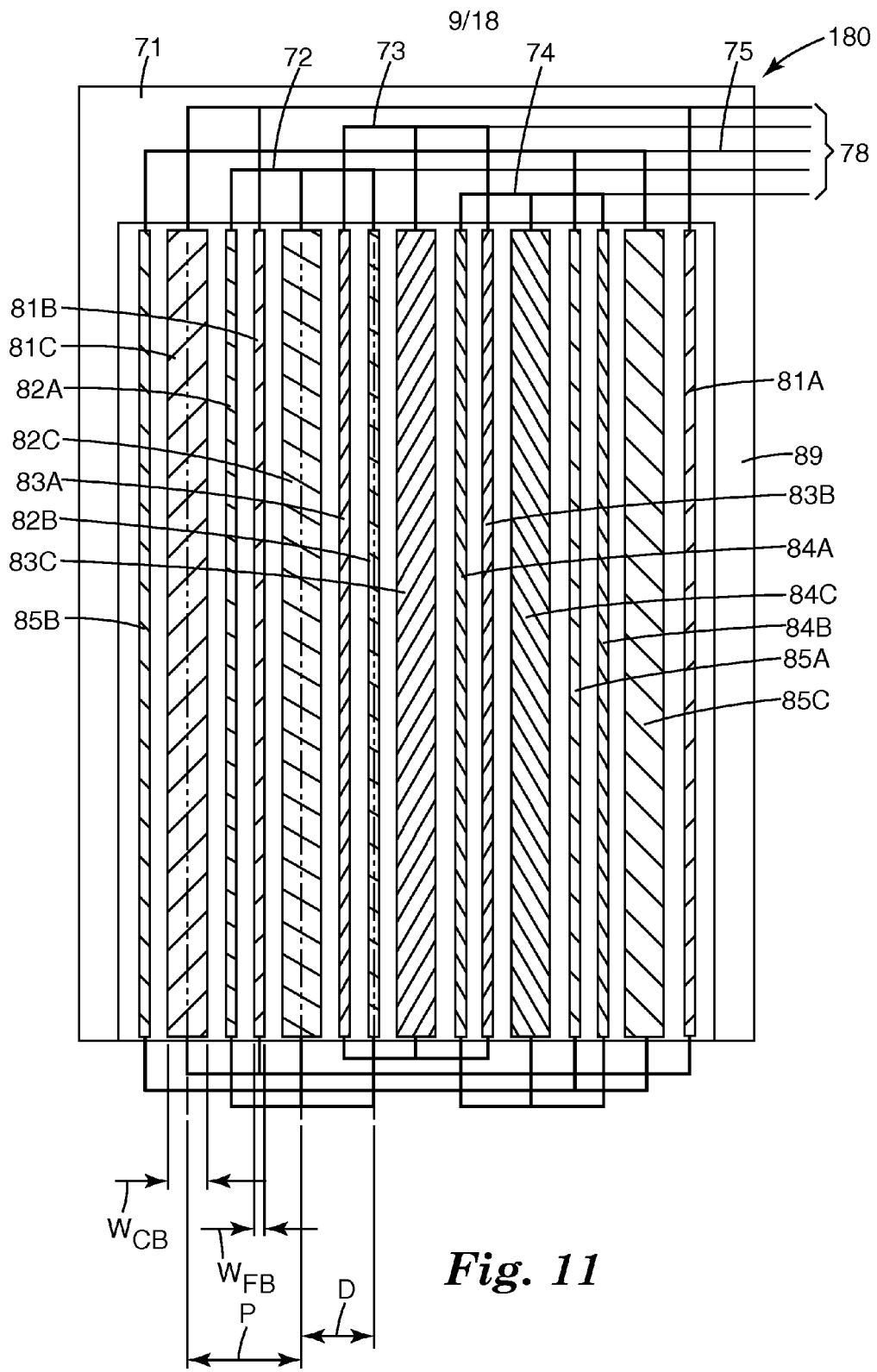
FIG. 11 illustrates a touch sensor having interleaved electrodes providing a transition from the one edge of the touch sensor to another edge in accordance with embodiments of the invention.
Figure 14:
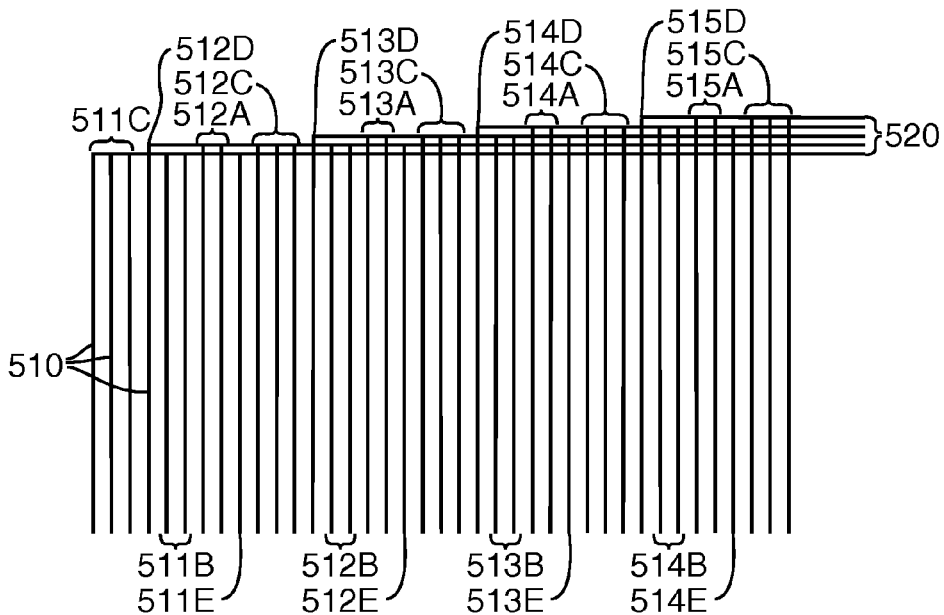
FIG. 14 illustrates primary electrodes and sub-electrodes comprising multiple parallel elements in accordance with embodiments of the invention.
Figure 15:
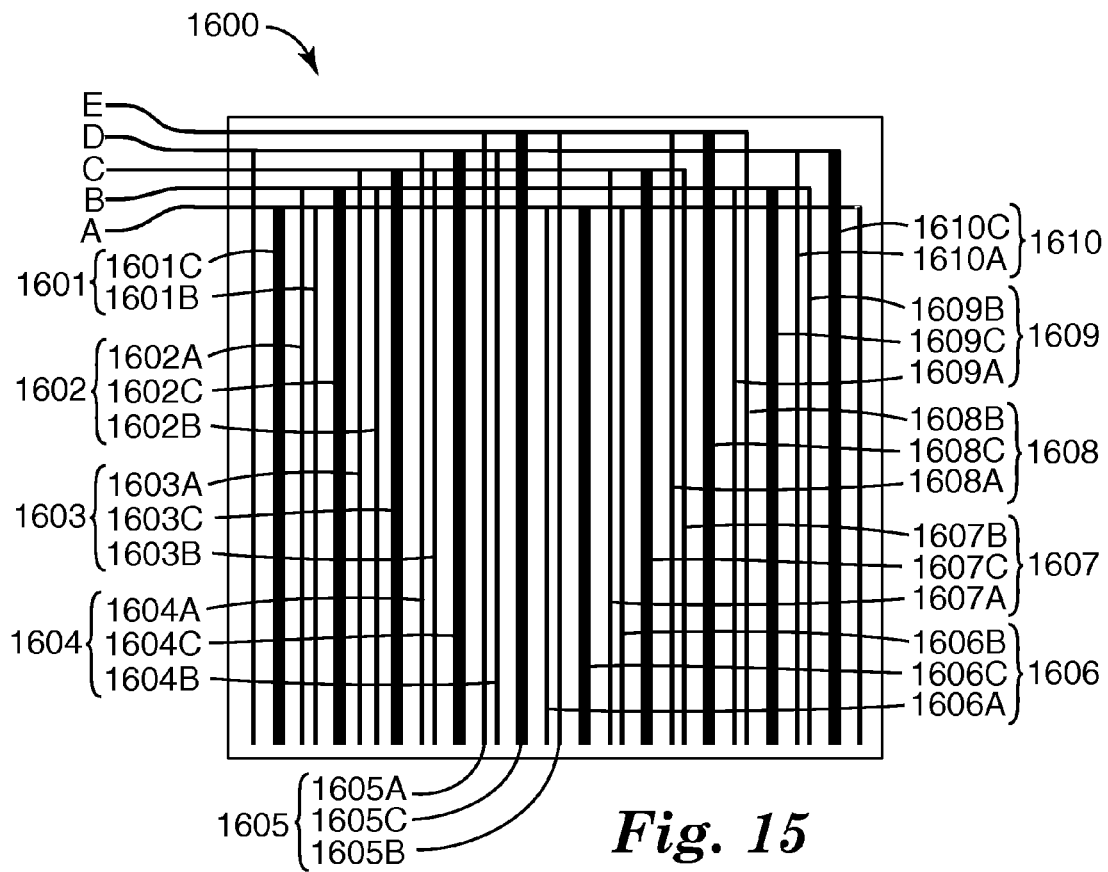
FIG. 15 illustrates electrode sets that are connected in accordance with a coding scheme in accordance with embodiments of the invention.

Electrodes of each set are interconnected at one end by interconnects 141-145. Electrodes may optionally be connected on the opposite end by interconnects 161-165. This is advantageous when electrodes have relatively high resistance, as is often the case when electrodes are made of transparent films such as indium tin oxide (ITO). Interconnecting each set of electrodes at both ends reduces resistance from any point on an electrode to signal lines 148 because current from any point on an electrode can follow two parallel paths to reach signal lines 148, rather than one. FIGS. 3A, 7, and 11 show examples of electrode sets interconnected at both ends. FIGS. 13C, 14, and 15 show examples of electrode sets connected at one end. In addition, signal lines may be directly connected to both ends of each electrode set to provide a further reduction in resistance; i.e. 161 may be connected to 141, which is directly connected to one of signal lines 148; 142 may be connected to 162, etc. This has the disadvantage that additional border width 168 and/or 169 is required to route connections between the two ends of the sensor, and additional parasitic capacitance is added.

The two levels of sub-electrodes of sensor 140 provide additional control over the shape of touch response profiles such as those illustrated in FIG. 6. Additional sub-electrode levels may allow wider spacing between electrode sets, and/ or lower end-to-end resistance of each electrode set. Multiple-level electrode sets (5 or more electrodes) may cover more of the sensor surface than single-level (3-electrode) sets, so they may be particularly advantageous when used on the bottom electrodes of a matrix sensor. Use of non-interleaved electrodes (FIG. 2B) or single-level sets for the top layer of electrodes (FIG. 3A) may allow more space between sub-electrodes. This exposes more of the lower layer of electrodes for maximum capacitive coupling to lower electrodes.

In some embodiments, a sub-electrode at one edge of the touch sensor may be interconnected with a corresponding primary electrode at an opposite edge of the sensor. The purpose of this sub-electrode is to provide a signal for interpolation at the edge of the sensor. FIG. 11 shows one layer of a matrix touch sensor 180 having 5 sets of electrodes. Sensor 180 is identical to sensor 80 except that sub-electrode 81A has been moved to the right edge from the left, and sub-electrode 85B has been moved from the left edge to the right. The sub-electrode 81A is used for interpolation at the right edge, and the sub-electrode 85B is used for interpolation at the left edge of the sensor.

Each electrode may have a substantially constant width or a varying width along the length of the electrode. In the examples provided in FIGS. 3A, 7, and 11 each electrode has a rectangular shape with a substantially constant width along the length of the electrode. Electrodes having variable widths along their length may have portions that have various shapes, including, diamond, octagonal, hexagonal, or other geometric shapes. Some embodiments use an interleaved top layer of electrodes. Other embodiments use an interleaved top layer and a planar electrode on the bottom layer. Yet other embodiments use interleaved top and bottom layers. Yet other embodiments use interleaved electrodes on one layer and non-interleaved electrodes on another layer. If two layers of electrodes are used, the top layer electrodes may have the same or different widths, shapes, spacings, and/or levels or patterns of interleaving from the bottom layer electrodes.

In some embodiments, as is illustrated in FIGS. 12A-B and 13A-E, the shape and/or arrangement of the top layer electrodes and/or the bottom layer electrodes may be configured to increase capacitive coupling through one layer of electrodes to another layer of electrodes. For example, the shape and/or arrangement of the primary electrodes and/or the sub-electrodes on the top layer may be configured to increase capacitive coupling to primary electrodes and/or sub-electrodes of the bottom layer. The shape and/or arrangement of the primary electrodes and/or sub-electrodes on the bottom layer may also be configured to increase capacitive coupling through the top layer. In some implementations, the top and bottom layer electrodes may have complementary shapes that enhance capacitive coupling as illustrated in FIGS. 13A-E.

Figure 12A:
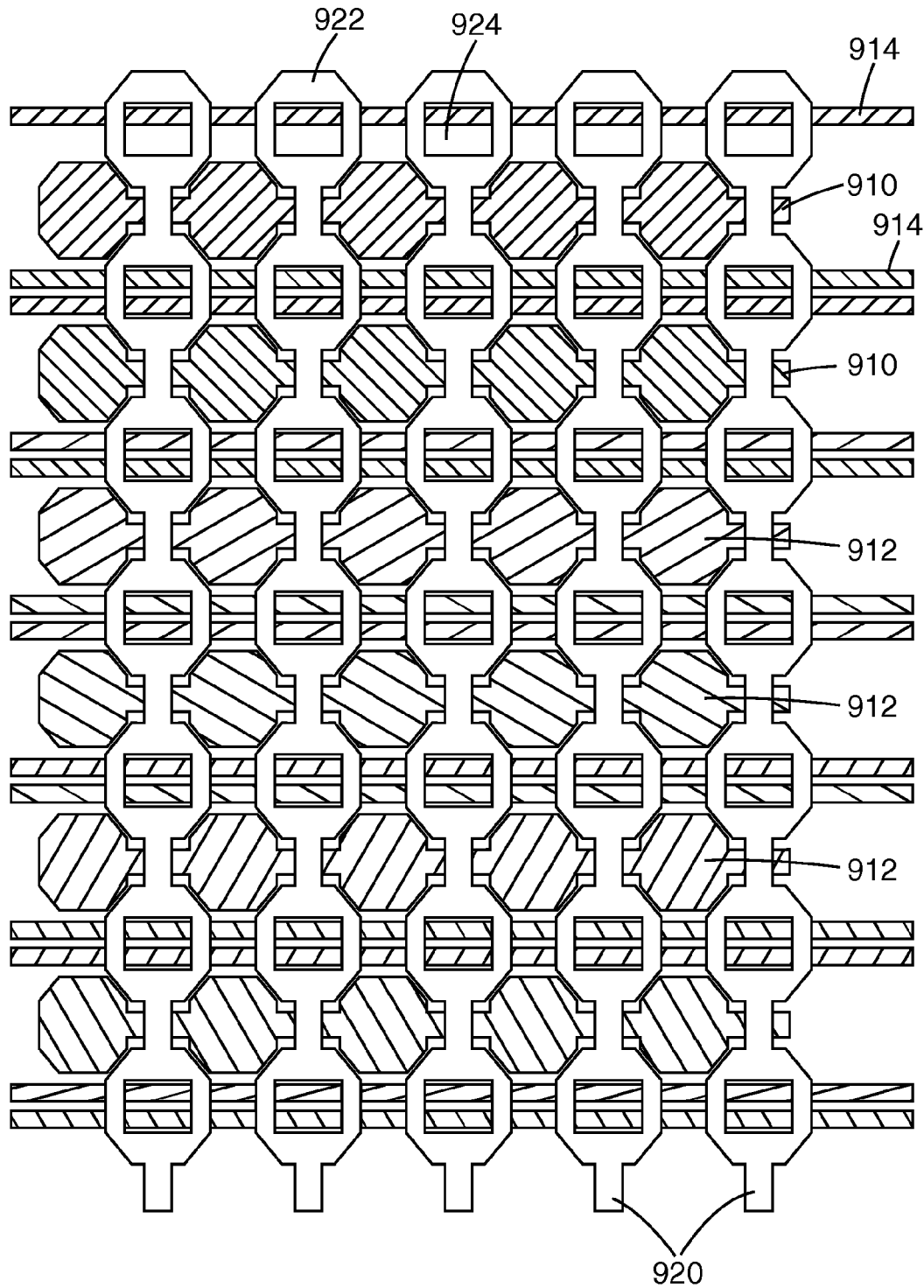
FIGS. 12A, 12B, and 13A-13E illustrate configurations for interleaved electrodes in accordance with embodiments of the invention.
Figure 12B:
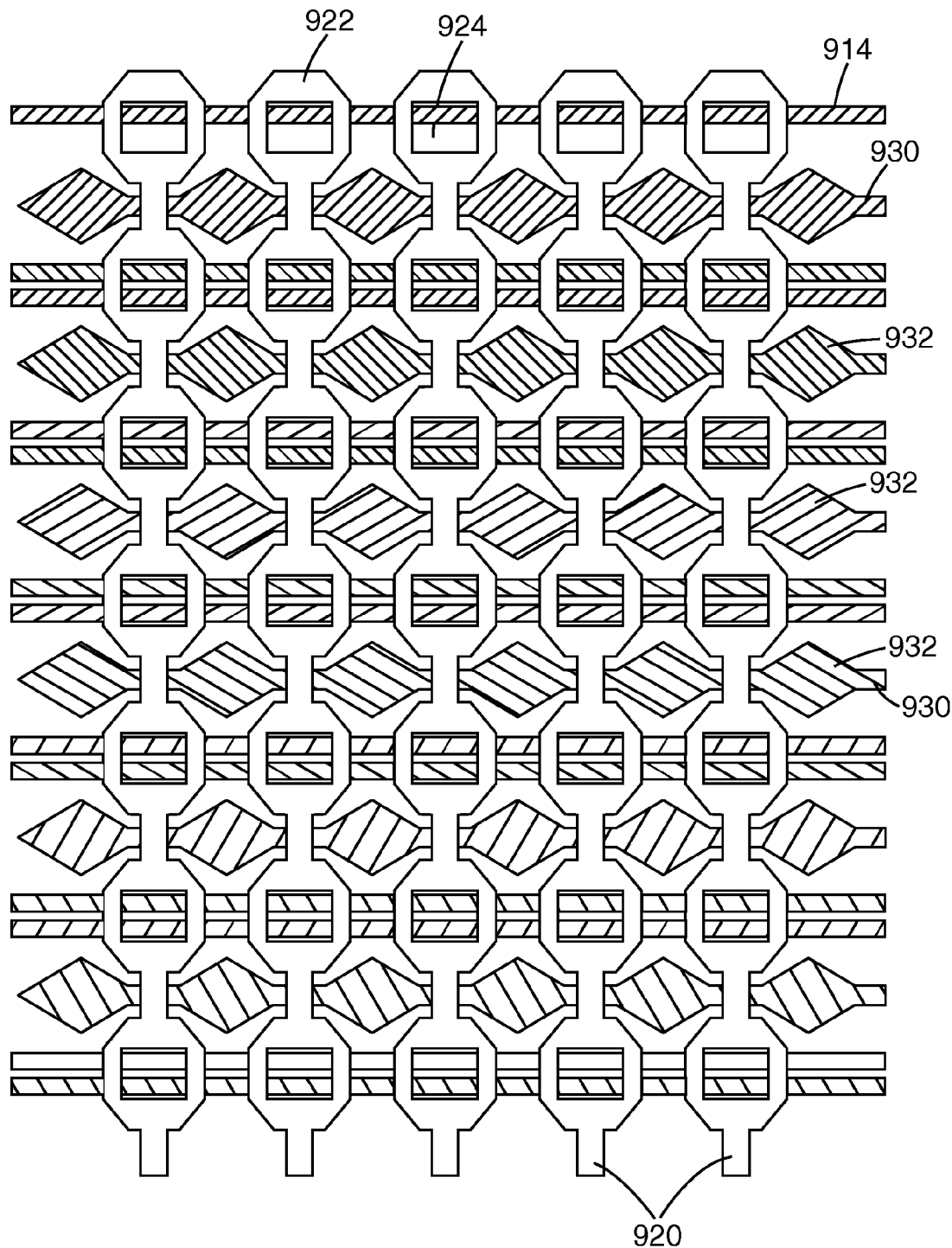

FIG. 12A illustrates a plan view of an electrode pattern that includes top and bottom layers of electrodes. The bottom layer electrodes, comprising the substantially horizontal electrodes of FIG. 12A, are arranged in an interleaved pattern. The primary electrodes 910 have portions configured as octagons 912 with interleaved rectangular sub-electrodes 914. In this embodiment, electrodes 920 of the top layer are not interleaved. The top layer electrodes 920, which are the vertical electrodes in FIG. 12A, include octagonal segments of conductive material 922 with a rectangular opening in the center 924. The opening in the center 924 enhances capacitive coupling of a touch to the sub-electrodes of the bottom layer 914. The increased capacitive coupling through the openings 924 of the top layer electrodes is most significant to the sub-electrodes of the bottom layer which lie just below the non-conducting centers 924 of the top layer electrodes. FIG. 12B illustrates a similar touch sensor where the primary electrodes 930 on the bottom layer include diamond shaped portions 932 in place of the octagonal portions 912 of the sensor illustrated in FIG. 12A.

Figure 13A:
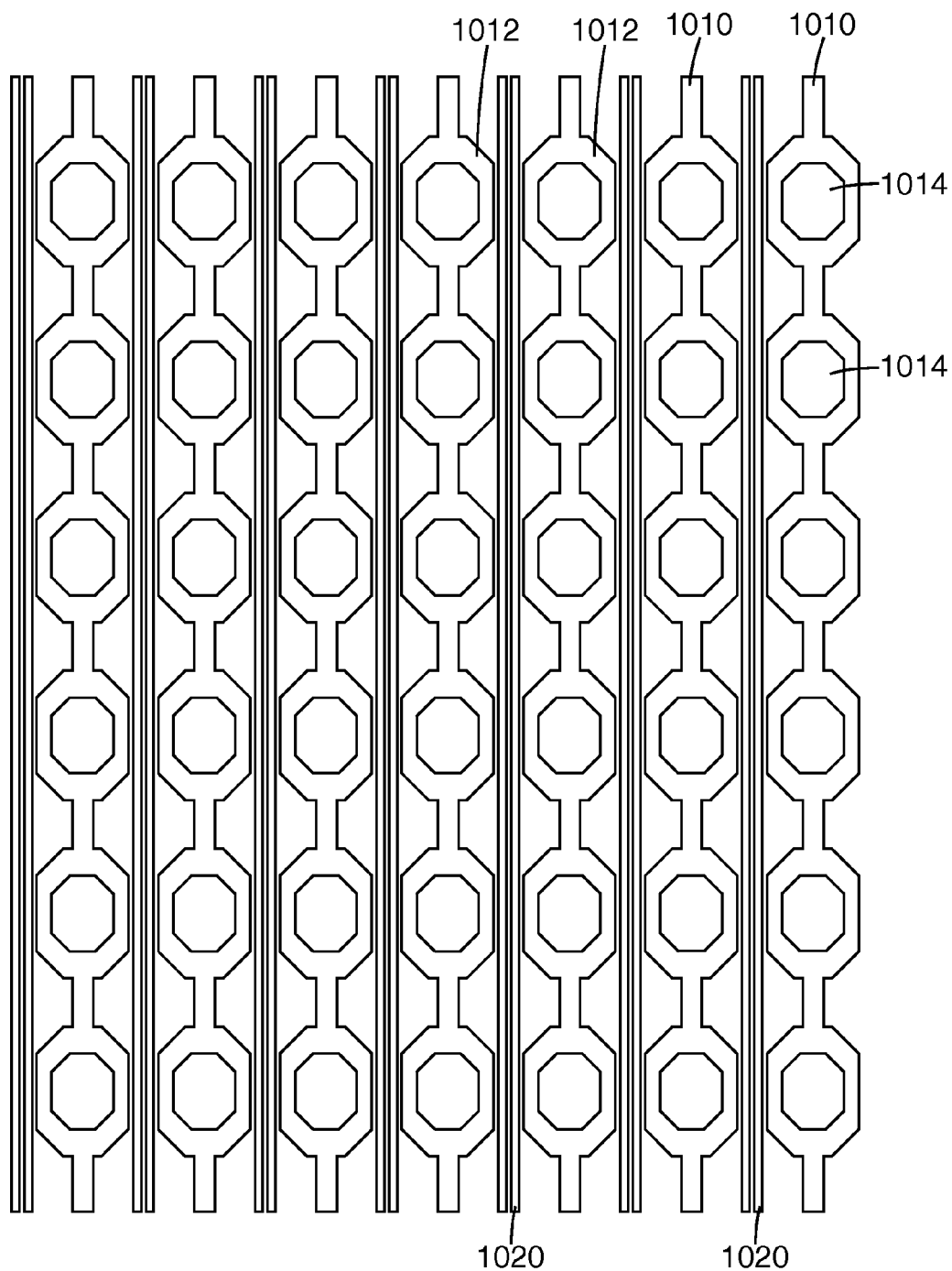
Figure 13B:
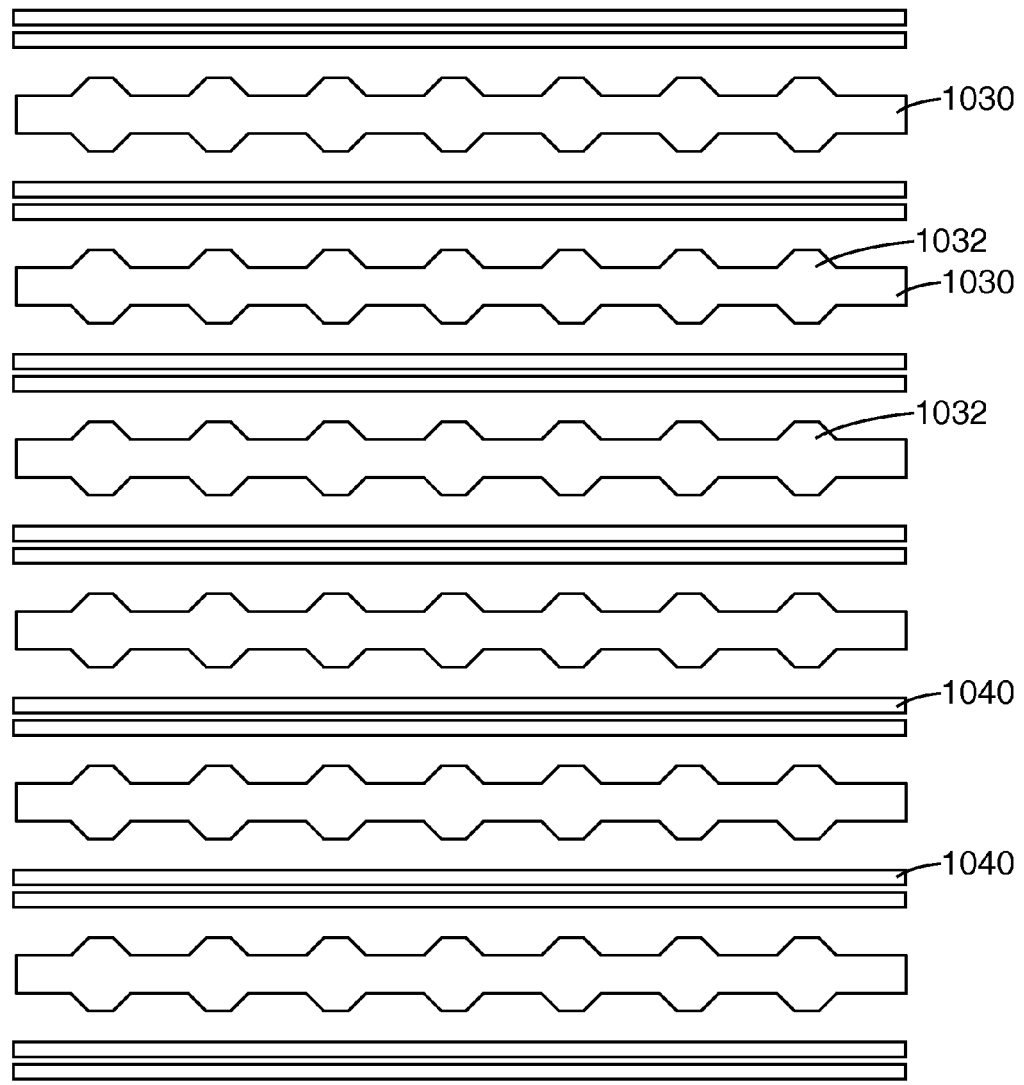
Figure 13C:
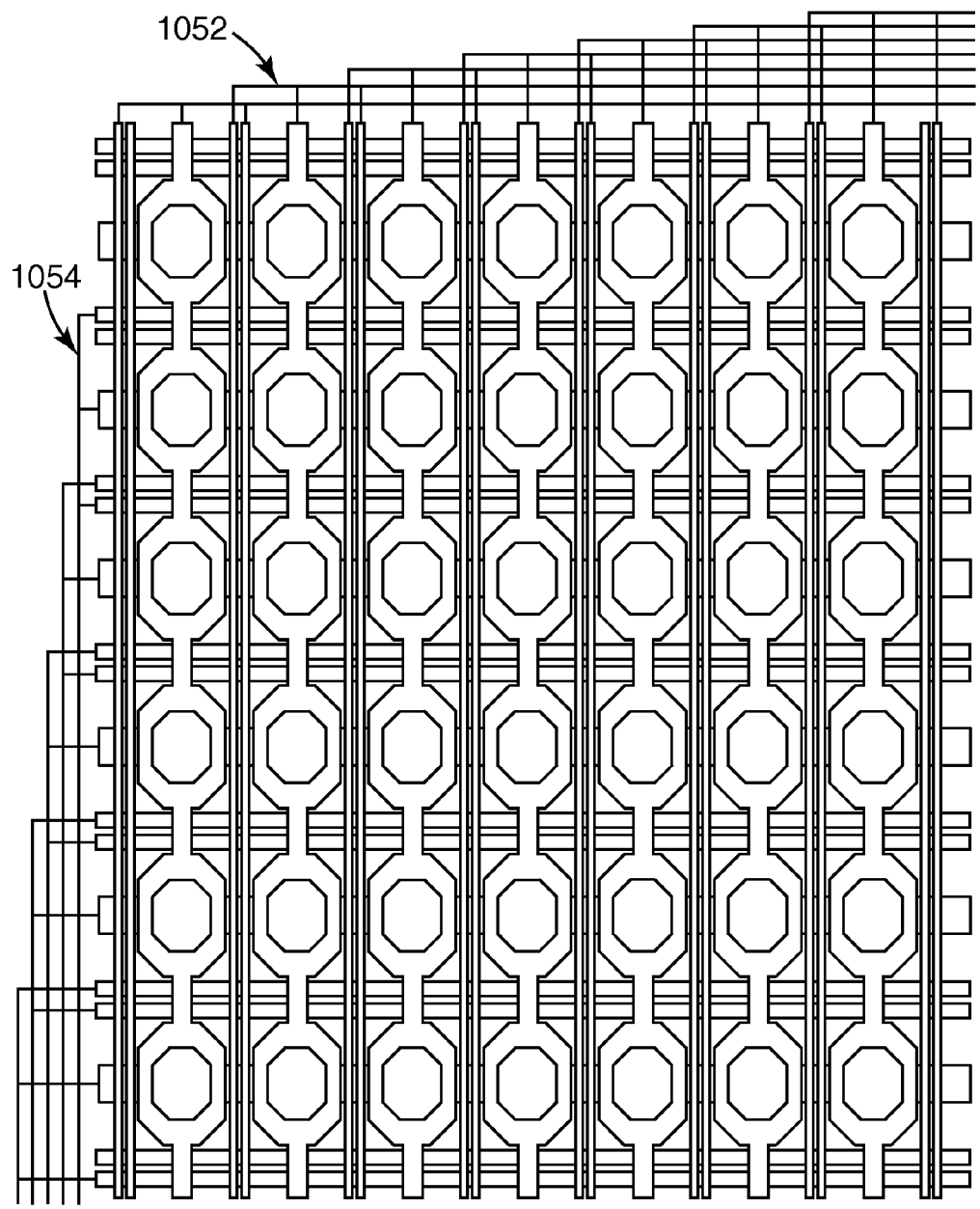

In some embodiments, both the top and the bottom layers may include electrodes having complementary shapes as illustrated in FIGS. 13A-13E. FIG. 13A is a plan view illustrating a top layer of interleaved electrodes, FIG. 13B is a plan view illustrating a bottom layer of electrodes, and FIG. 13C is a plan view illustrating both top and bottom layers. In this example, the primary electrodes of the top layer 1010 include portions having an octagonal segment of conductive material 1012 with an octagonal opening in the center 1014. The opening in the centers 1014 promote capacitive coupling to the electrodes of the bottom layer, most significantly to the primary electrodes of the bottom layer that lie just below the opening 1014 of the top layer 1010 primary electrodes. The top layer sub-electrodes 1020 are rectangular with constant widths along the lengths of the sub-electrodes.

As illustrated in FIGS. 13B and 13C, the primary electrodes 1030 of the bottom layer include octagonal portions 1032 that are complementary with the openings 1014 of the top layer primary electrodes 1010. The octagonal portions 1032 of the bottom layer primary electrodes 1030 are arranged to be vertically aligned with the openings 1014 of the primary electrodes 1010 of the top layer. The sub-electrodes 1040 of the bottom layer are rectangular electrodes having constant widths along the lengths of the electrodes. FIG. 13C illustrates the interconnections 1052, 1054 between the interleaved primary electrodes 1010, 1030 and sub-electrodes 1020, 1040 of the top and bottom layers, respectively.

Figure 13D:
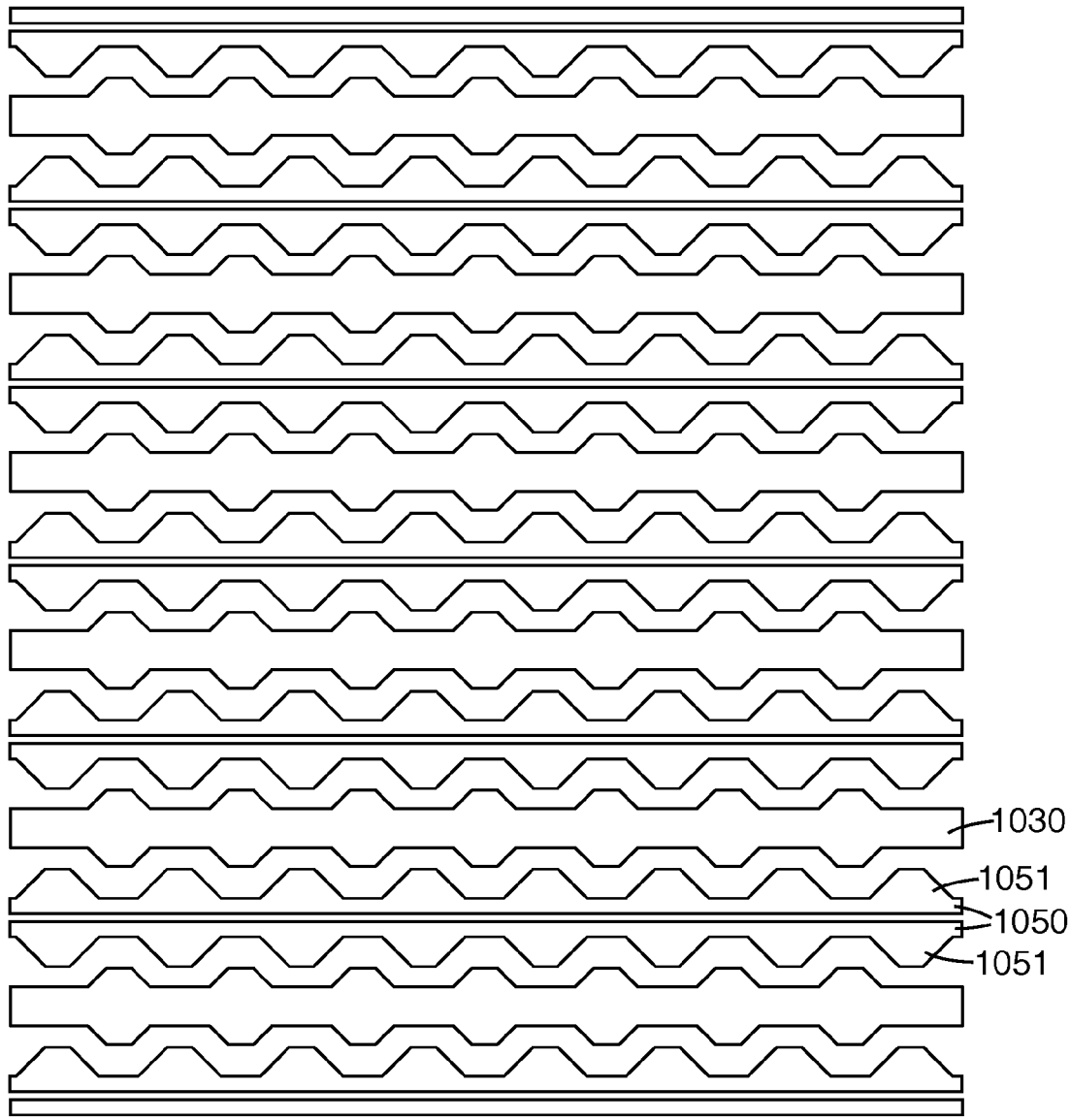
Figure 13E:
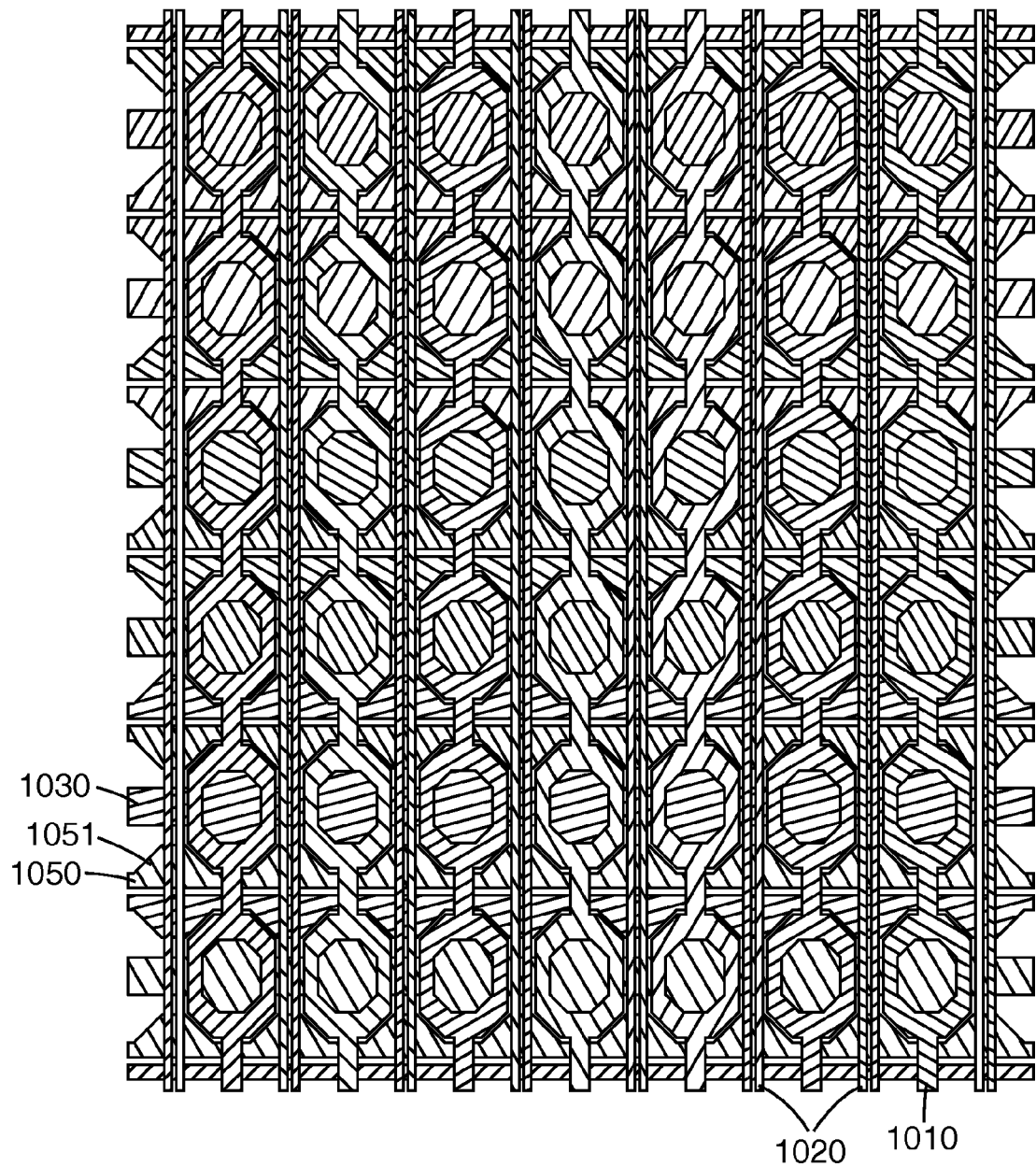

FIG. 13D illustrates an alternate configuration of the sub-electrodes 1050 of the bottom layer. In FIG. 13D, the rectangular sub-electrodes 1040 of FIG. 13B are replaced by sub-electrodes 1050 that include protruding regions 1051. The protruding regions 1051 are complementary with the octagonal portions 1012 of the top layer primary electrodes. FIG. 13E illustrates the plan view of a touch sensor having a top layer as illustrated in FIG. 13A and a bottom layer as illustrated in FIG. 13D.

In some embodiments, the electrodes, including primary and sub-electrodes, on one or both layers may be configured as multiple conductive elements. The multiple conductive elements that make up each electrode may be substantially parallel, substantially equally spaced and/or have substantially equal widths. FIG. 14 shows a layer of primary electrodes 511C, 512C, 513C, 514C, 515C and sub-electrodes 511A, 511B, 512A, 512B, 513A, 513B, 514A, 514B, 515A, 515B that are comprised of equally spaced, equal width parallel conductive elements 510. In this example, the parallel conductive elements 510 have been connected to five sets of electrodes 511-515, where each set of electrodes includes nine conductive elements 510, with 2-level interleaving with the adjacent set of sub-electrodes, (not all electrodes of the left-most and right-most sets are shown). The primary electrodes 511C, 512C, 513C, 514C, 515C each comprise three conductive elements 510. The first level sub-electrodes 511B, 512A, 512B, 513A, 513B, 514A, 514B, 515A are each comprised of two conductive elements 510. Second level sub-electrodes 511E, 512D, 512E, 513D, 513E, 514D, 514E, 515D are each comprised of single conductive elements 510. Construction of this type allows the production of a substrate with standardized conductive elements 510, illustrated by the vertical lines in FIG. 14, forming the electrodes. The standard substrate material may then be customized into any desired sensor configuration by a secondary process that includes printing the electrode interconnections 520, illustrated by the horizontal lines in FIG. 14, for example as described in commonly assigned and co-pending patent applications U.S. Ser. No. 11/025,559 and U.S. Ser. No. 11/120,025 which are incorporated herein by reference. In some configurations, the electrode elements may have substantially equal widths and the primary electrodes may comprise more electrode elements than the sub-electrodes. In other configurations, the electrode elements may not have equal widths, and/or the primary electrodes may have the same number of electrode elements as the sub-electrodes.

The embodiments of the invention use interleaved electrodes to increase the capacitive coupling of electrode sets. The electrode sets of the present invention may additionally be connected in a coding scheme to further reduce the number of signal lines connecting to the controller. The number of signal lines and corresponding TMPs for a touch system may be reduced if the electrode sets are connected to the signal lines in accordance with a coding scheme that facilitates touch location determination without requiring independent access to each electrode set. One useful coding method of arranging the electrode sets is a positional encoding scheme, which may also referred to as a unique neighboring scheme. In this scheme, each electrode set shares the same signal line with several other electrode sets. The electrode sets are arranged so that each electrode set is grouped with neighboring electrode sets. When a touch implement couples to one of the electrode sets connected to a single signal line, the touched electrode set can be recognized from other electrode sets sharing the same signal line by analyzing the relative strengths of signals caused by the touch. A combination of electrode sets having stronger signals may be detected and used to identify the touch location. The physical separation between the electrode sets that are connected to the same signal line must be large enough so that a touch to the touch screen is strongly sensed by only one electrode set among the electrode sets connected to the same signal line. The coding scheme is selected to provide sufficient separation between electrode sets that are attached to the same signal line to avoid confusion in determining the touch location. Exemplary coding schemes for touch sensors are described in more detail in commonly owned US Patent Publication 2003/0234771A1 which is incorporated herein by reference.

FIG. 15 shows sensor layer 1600 with 10 sets of interleaved electrodes 1601, 1602, 1603, 1604, 1605, 1606, 1607, 1608, 1609, 1610 having primary electrodes 1601C, 1602C, 1603C, 1604C, 1605C, 1606C, 1607C, 1608C, 1609C, 1610C having respectively associated sub-electrodes 1601A, 1601B, 1602A, 1602B, 1603A, 1603B, 1604A, 1604B, 1605A, 1605B, 1606A, 1606B, 1607A, 1607B, 1608A, 1608B, 1609A, 1609B, 1610A, 1610B. The 10 electrode sets 1601, 1602, 1603, 1604, 1605, 1606, 1607, 1608, 1609, 1610 are connected to five signal lines A, B, C, D, and E such that each signal line A, B, C, D, E is connected to two electrode sets 1601, 1602, 1603, 1604, 1605, 1606, 1607, 1608, 1609, 1610. Electrode sets 1601, 1602, 1603, 1604, 1605, 1606, 1607, 1608, 1609, 1610 are arranged in a positionally encoded scheme whereby each instance of adjacent electrode sets are associated with a combination of signal lines. For example, electrode set 1602 is coupled to signal line B and is adjacent to electrode sets 1601 and 1603 coupled to signal lines A and C, respectively. The other instance of an electrode set coupled to signal line B is electrode set 1609 which is adjacent to electrode set 1608, coupled to signal line E, and electrode set 1610, coupled to signal line D. For example, if signal lines A and B, or B and C have the strongest signals, resulting from coupling to a touch, the touch is known to be near the leftmost electrode set 1602 coupled to signal line B. If signal lines B and D or B and E have the strongest signals, the touch is known to be near the right-most electrode set 1609 coupled to signal line B.

Touch screens in accordance with embodiments of the present invention may be opaque or transparent, depending on their intended application. For transparent touch screens the electrodes may be formed of a transparent conductive material, such as indium tin oxide (ITO) or other transparent conductor deposited on an insulating substrate. For applications that do not require transparency, electrodes may be made of metal or other conductive materials. Transparent touch screens are often used in conjunction with a display that is viewable through the touch screen.

A method for making the touch sensors having interleaved conductors involves disposing sets of electrodes on a substrate in accordance with an interleaved pattern. Each set of electrodes includes a primary electrode capable of producing greater capacitive coupling to a touch in relation to capacitive coupling of sub-electrodes electrically connected and parallel to the primary electrode. The primary electrode is disposed between at least two of the sub-electrodes. The interleaved pattern is configured to increase an effective area of capacitive coupling associated with the set of electrodes.

Figure 16:
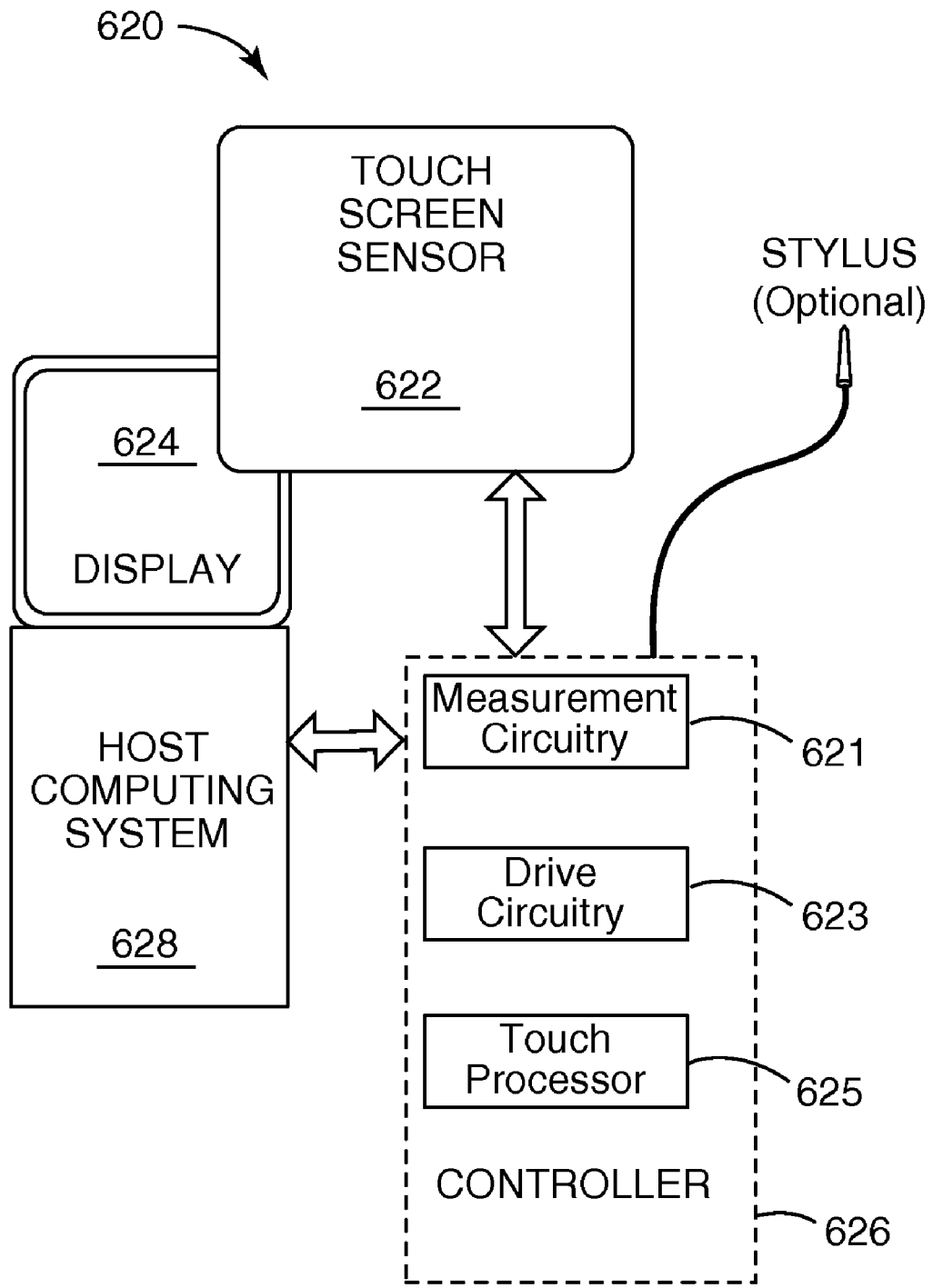
FIG. 16 illustrates a touch sensing system that may incorporate a touch screen having interleaved electrodes in accordance with embodiments of the invention.

FIG. 16 illustrates a touch sensing system that may incorporate the touch sensor having interleaved electrodes as described herein. The touch sensing system 620 shown in FIG. 16 includes a touch screen 622 having interleaved electrodes which is connected to the TMPs of a controller 626. In a typical deployment configuration, the touch screen 622 is used in combination with a display 624 of a host computing system 628 to provide for visual and tactile interaction between a user and the host computing system.

It is understood that the touch screen 622 can be implemented as a device separate from, but operative with, a display 624 of the host computing system 628. Alternatively, the touch screen 622 can be implemented as part of a unitary system which includes a display device, such as a plasma, LCD, or other type of display technology suitable for incorporation of the touch screen 622. It is further understood that utility is found in a system defined to include only the touch sensor 622 and controller 626 which, together, can implement a touch methodology of the present invention.

In the illustrative configuration shown in FIG. 16, communication between the touch screen 622 and the host computing system 628 is effected via the controller 626. It is noted that one or more controllers 626 can be connected to one or more touch screens 622 and the host computing system 628. The controller 626 is typically configured to execute firmware/software that provides for detection of touches applied to the touch sensor 622 by measuring signals on the interleaved electrodes of the touch screen 622 arranged in accordance with the principles of the present invention. It is understood that the functions and routines executed by the controller 626 can alternatively be effected by a processor or controller of the host computing system 628.

In one particular configuration, for example, the host computing system 628 is configured to support an operating system and touch screen driver software. The host computing system 628 can further support utility software and hardware. It will be appreciated that the various software/firmware and processing devices used to implement touch sensor processing and functionality can be physically or logically associated with the controller 626, host computing system 628, a remote processing system, or distributed amongst two or more of the controller 626, host computing system 628, and remote processing system.

The controller 626 typically includes circuitry 621 for measuring touch signals sensed using the interleaved electrodes and a touch processor 625 configured to determine the location of the touch using the measured signals. The touch sensing system 620 may be used to determine the location of a touch by a finger, passive stylus or active stylus. In applications that sense a finger touch or passive touch implement, the controller includes drive circuitry 623 to apply an appropriate signal to the electrodes of the touch screen 622. In some embodiments, circuitry 621 for measuring the touch signals may be incorporated into the housing of the passive stylus. In systems using an active stylus, the active stylus generates a signal that is transferred to the electrodes via capacitive coupling when the active stylus is near the surface of the touch sensor.

Some components of the controller 626 may be mounted to a separate card that is removably installable within the host computing system chassis. Some components of the controller 626, including drive circuitry 623, sensing circuitry, or measurement circuitry 621, including filters, sense amplifiers, A/D converters, and/or other signal processing circuitry may be mounted in or on a cable connecting the touch screen 622 to the controller 626.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A capacitive touch sensing system, comprising:
   a touch surface; and
   sets of substantially parallel electrodes arranged in relation to the touch surface, each electrode set comprising a primary electrode capable of producing greater capacitive coupling to a touch in proximity with the touch surface in relation to capacitive coupling of at least two sub-electrodes electrically connected to the primary electrode by way of interconnects, and disposed on either side of the primary electrode, the sub-electrodes of the electrode sets arranged in an interleaved pattern configured to increase an effective area of capacitive coupling associated with each electrode set.

2. The touch sensing system of claim 1, wherein the interleaved pattern is configured to shape touch response profiles respectively associated with the electrode sets, each touch response profile representative of a relationship between touch signal amplitude and touch position relative to a particular electrode set.

3. The touch sensing system of claim 2, wherein the interleaved pattern is configured to modify a slope of each touch response profile.

4. The touch sensing system of claim 2, wherein widths of the primary electrode and the at least two sub-electrodes of each electrode set are configured to shape the touch response profiles of the electrode sets.

5. The touch sensing system of claim 2, wherein a spacing between the primary electrode and the at least two sub-electrodes of each electrode set is configured to shape the touch response profiles of the electrode sets.

6. The touch sensing system of claim 1, wherein the interleaved pattern is configured to increase a region of linearity of the touch response profiles respectively associated with the electrode sets, each touch response profile representing a relationship between touch signal amplitude and touch position relative to a particular electrode set.

7. The touch sensing system of claim 1, wherein the interleaved pattern is configured to facilitate interpolation among touch signals sensed using the adjacent electrode sets to facilitate touch location determination.

8. The touch sensing system of claim 1, wherein the interleaved pattern is configured to smooth a touch signal transition as the touch is moved from one electrode set to another electrode set.

9. The touch sensing system of claim 1, wherein each electrode set comprises the primary electrode electrically connected to the at least two sub-electrodes at both ends of the primary electrode.

10. The touch sensing system of claim 1, wherein each electrode set comprises the primary electrode electrically connected to the at least two sub-electrodes at one end of the primary electrode.

11. The touch sensing system of claim 1, wherein the interconnects are comprised of the same material as either any primary electrode or any sub-electrode.

12. The touch sensing system of claim 1, wherein the electrode sets are arranged on a single layer.

13. The touch sensing system of claim 1, wherein the electrode sets are arranged on first and second layers, a longitudinal axis of the electrode sets of the first layer arranged at an angle with respect to a longitudinal axis of the electrode sets of the second layer.

14. The touch sensing system of claim 13, wherein the longitudinal axis of the electrode sets of the first layer is substantially orthogonal to the longitudinal axis of the electrode sets of the second layer.

15. The touch sensing system of claim 1, wherein the interleaved pattern comprises a single level of interleaving.

16. The touch sensing system of claim 1, wherein the interleaved pattern comprises multiple levels of interleaving.

17. The touch sensing system of claim 1, wherein the interleaved pattern comprises a repetitive pattern.

18. The touch sensing system of claim 1, wherein the interleaved pattern comprises at least one sub-electrode near one edge of the touch surface that is electrically connected with a corresponding primary electrode near an opposite edge of the touch surface.

19. The touch sensing system of claim 1, further comprising:
    circuitry configured to measure signals sensed using the electrode sets; and
    a touch processor coupled to the circuitry and configured to determine a location of the touch in proximity with the touch surface based on the measured signals.

20. The touch sensing system of claim 19, wherein the circuitry is disposed within a touch stylus.

21. The touch sensing system of claim 1, wherein the touch surface and the sets of electrodes and associated interconnects arranged in relation to the touch surface form a transparent touch screen.

22. The touch sensing system of claim 21, further comprising a display viewable through the transparent touch screen.

* * * * *

UNITED STATES PATENT AND TRADEMARK OFFICE
CERTIFICATE OF CORRECTION

PATENT NO. : 7,864,160 B2
APPLICATION NO. : 11/243534
DATED : January 4, 2011
INVENTOR(S) : Bernard Geaghan It is certified that error appears in the above-identified patent and that said Letters Patent is hereby corrected as shown below:

Column 6

Line 19; delete "−180°" and insert -- −18° -- therefor.

Signed and Sealed this
Fifth Day of April, 2011

David J. Kappos
*Director of the United States Patent and Trademark Office*